US00RE40324E

(19) United States
(12) Reissued Patent
Crawford

(10) Patent Number: US RE40,324 E
(45) Date of Reissued Patent: May 20, 2008

(54) THUMB ACTUATED X-Y INPUT DEVICE

(75) Inventor: Peter James Crawford, Chapel Hill, NC (US)

(73) Assignee: Dhol New Ventures, LLC, Wilmington, DE (US)

(21) Appl. No.: 11/409,542

(22) Filed: Apr. 20, 2006

Related U.S. Patent Documents

Reissue of:
(64) Patent No.: 6,724,366
Issued: Apr. 20, 2004
Appl. No.: 09/825,107
Filed: Apr. 3, 2001

(51) Int. Cl.
*G09G 5/08* (2006.01)

(52) U.S. Cl. ..... 345/157; 345/173; 345/156; D14/405; D14/412; D14/418; 348/601; 348/734; 463/37

(58) Field of Classification Search ..... 345/156–167, 345/173–176; D14/405, 412, 418; 348/734, 348/601; 463/37
See application file for complete search history.

(56) References Cited

U.S. PATENT DOCUMENTS 3,517,678 A * 6/1970 Gilsdorf ..... 135/72
4,497,982 A * 2/1985 Michalski ..... 200/5 R
4,641,857 A * 2/1987 Gailiunas ..... 280/821
4,831,736 A * 5/1989 Bryant, Sr. ..... 33/1 M
4,862,165 A * 8/1989 Gart ..... 341/20
5,011,149 A * 4/1991 Purnell ..... 273/148 B
5,287,090 A * 2/1994 Grant ..... 345/163
5,327,161 A * 7/1994 Logan et al. ..... 345/157
5,414,445 A * 5/1995 Kaneko et al. ..... 345/163

(Continued)

OTHER PUBLICATIONS

Web page printed Oct. 20, 2000, http://www.me.berkley.edu/ergo/research/injuryate.html;*Repetitive Motion Disorders*, Ergonomics Program, statistical graph based on Bureau of Labor Statistics–University of California, San Francisco and University of California, Berkeley, 1 page, (1999).*

*Table 3. Number and Percent of Nonfatal Occupational Injuries and Illnesses Involving Days Away From Work Involving Repetitive Motion by Selected Worker and Case Characteristics, 1997* —U.S. Department of Labor—Bureau of Labor Statistics, 3 pages, (Apr. 1999).*

(Continued)

*Primary Examiner*—Henry N Tran
(74) *Attorney, Agent, or Firm*—Graybeal Jackson Haley LLP

(57) ABSTRACT

Various x-y input devices are disclosed that are adapted to allow a user to hold and operate the input device with a stress-reducing, open grip posture with the thumb pointing forward and on top of the device. One preferred embodiment discloses an input device for a computer comprising an x-y input sensor (such as a touchpad) positioned perpendicular to the thumb such that the user provides input with the thumb tip by using pivotal movement of the thumb. Various stress-reducing zero force touch switches are disclosed including zero force touch switches that can be adjusted to accommodate variations in user finger length. The mode of x-y cursor control can be altered through the use of x-y input sensor perimeter inputs. One preferred embodiment discloses a thumb actuated scroll select touch switch that alters the response to actuation of the finger actuated zero force touch switches from mouse button input to scroll wheel input. A unique fin-shaped feature of one preferred embodiment stabilizes the device within the relaxed hand and adapts the device to fit a range of user hand sizes.

54 Claims, 16 Drawing Sheets

U.S. PATENT DOCUMENTS

| | | | | | |
|---|---|---|---|---|---|
| 5,530,455 | A | * | 6/1996 | Gillick et al. | 345/163 |
| 5,543,590 | A | * | 8/1996 | Gillespie et al. | 178/18.06 |
| 5,563,628 | A | * | 10/1996 | Stroop | 345/156 |
| 5,570,112 | A | * | 10/1996 | Robinson | 345/163 |
| 5,576,733 | A | * | 11/1996 | Lo | 345/163 |
| 5,648,798 | A | * | 7/1997 | Hamling | 345/163 |
| D381,970 | S | * | 8/1997 | Gasca | D14/405 |
| 5,668,574 | A | * | 9/1997 | Jarlance-Huang | 345/158 |
| 5,724,106 | A | * | 3/1998 | Autry et al. | 348/734 |
| 5,726,683 | A | * | 3/1998 | Goldstein et al. | 345/163 |
| 5,748,185 | A | * | 5/1998 | Stephan et al. | 345/173 |
| D396,034 | S | * | 7/1998 | Whiteing | D14/405 |
| 5,805,256 | A | * | 9/1998 | Miller | 348/734 |
| 5,832,323 | A | * | 11/1998 | Goto | 396/297 |
| 5,943,052 | A | * | 8/1999 | Allen et al. | 715/787 |
| 5,990,871 | A | * | 11/1999 | Adams et al. | 345/167 |
| 6,031,518 | A | * | 2/2000 | Adams et al. | 345/156 |
| 6,057,554 | A | * | 5/2000 | Plesko | 250/566 |
| 6,096,984 | A | * | 8/2000 | Howell et al. | 178/18.01 |
| 6,184,862 | B1 | * | 2/2001 | Leiper | 345/156 |
| 6,222,526 | B1 | * | 4/2001 | Holmes | 345/161 |
| 6,232,956 | B1 | * | 5/2001 | Mailman | 345/156 |
| 6,492,633 | B2 | * | 12/2002 | Nakazawa et al. | 250/221 |
| 6,724,366 | B2 | * | 4/2004 | Crawford | 345/157 |

OTHER PUBLICATIONS

Web pages printed Oct. 1, 2000, http://www.tifaq.org.articles/computer_related_symptoms–peper–gibney.html; Erik Peper, Ph.D. and Katherine H. Gibney, *Computer Related Symptoms: A Major Problem For College Students,* Institute for Holistic Healing Studies, San Francisco State University, 6 pages, (Sep. 4, 1998), p. 2, statistical graph, figure 1:*Discomfort Intensity Rating For Each Body Location*.*

Pete W. Johnson, *Pointing Device Summary*, Ergonomics Program, University of California, San Francisco and University of California, Berkeley, 5 pages, (Jul. 18, 1994), p. 2, paragraphs, 2, 3 and 4; p. 2, paragraph 2; and p. 2, paragraph 4.*

Web pages printed Oct. 21, 2000, http://www.me.berkely.edu/ergo/servieces/tips/checklist.html;_Pete W. Johnson, *Computer Workstation Self–Audit Checklist*, Ergonomics Program, University of California, San Francisco and University of California, Berkely, 4 pages, (Jul. 18, 1994), p. 3, paragraph 1.*

Alan Hedge, Ph.D., M.Erg.S., A.F.B.Ps.S, *Ergonomic Guidelines for Arranging a Computer Workstation—10 Tips for Users,*. Ergonomics Research Laboratory, Cornell University—Department of Design & Environmental Analysis, 5 pages, (Feb. 6, 1999), p. 3, tip No. 7, and p. 5, paragraph 4; p. 3, tip No. 6; and p. 5, paragraph 1.*

Web pages printed Oct. 21, 2000, http://www.office–ergo.com/alternat.html; *Hand/Wrist Basics—Ten Things You Should Know About Hand Wrist Pain*—F–One Ergonomics, Ann Arbor, Michigan, 5 pages, p. 2, item No. 2; p. 2, item No. 3; and p. 4, item No. 9.*

Web pages printed Oct. 21, 2000, http://www.office–ergo.com/; *Office Ergonomics*—F–One Ergonomics, Ann Arbor, Michigan, 2 pages.*

Web pages printed Jul. 3, 2000, http://www.superkids.com/aweb/pages/features/mouse/mouse.html; Andrew Maisel, *Doug Engelbart: Father of the Mouse*. An exclusive interview in SuperKids Software Review, 4 pages.*

Web pages printed Jul. 3, 2000, http://www.zdnet.com/filters/printerfriendly/0,6601,289969–3,00.html;Amy Abel, *Anir. Ergonomic Mouse Pro Rescues Fatigues Wrist*, Computer Shopper, 2 pages, (Mar. 20, 1998).*

Web pages printed Jul. 3, 2000, http://www.zdnet.com/filters/printerfriendly/0,6061,2596969–2,00.html; Jesse Berst, *EEEEEK! A Better Mouse*, Anchor Desk, 2 pages, (Jun. 29, 2000).*

Web pages printed Jul. 3, 2000, http://www.zdnet.com/zdnn/stories/news/0,4586,2597529,00.html;Daniel Drew Turner and Matthew Rothnberg, *Apple May Exterminate Round Mouse*, ZDNET News, 6 pages, (Jun. 30, 2000).*

Web pages printed Oct. 4, 2000, http://www.zdnet.com/products/content/cshp/1712/0037.html; Scot A, May, *Logitech Reinvents the Scroll Wheel With the MouseMan+*, Computer Shopper, 3 pages, (Dec. 1997).*

Web pages printed Jul. 20, 2000, http://macworld.zdnet.com/2000/07/19keyboard.html; Lisa Schmeiser, *Kiss the Hockey Puck Goodbye—New Pro Keyboard, Mouse Spell the End for Hated Peripherals.*, MacWorld Expo, 3 pages.*

Web page advertisement printed Nov. 1, 2000, http://www.lapmouse.com/; *Lapmouse—A mouse pad for your lap!*, copyright Betty Fisher, 2 pages, (1994).*

Instruction page, *Comfort Guidelines, Feels Good, Feels Better . . .* , Logitech, 1 page, (1998).*

Web page advertisement printed Apr. 2, 2001, http://www.houseofgoldgifts.net/lapmousepads.html; *Universal Ergonomic Lap Mouse Pad*, House of Gold Gifts, 2 pages, (1994).*

* cited by examiner

Fig. 5A
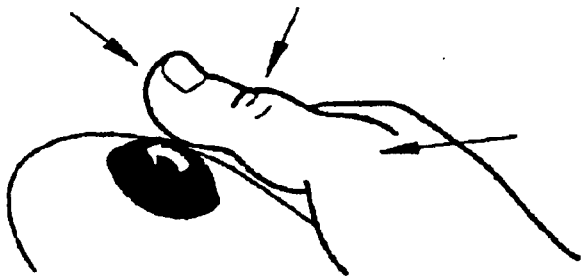
Fig. 5B
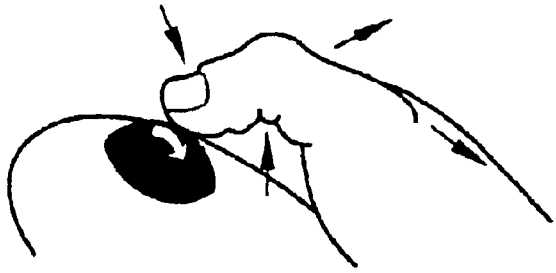
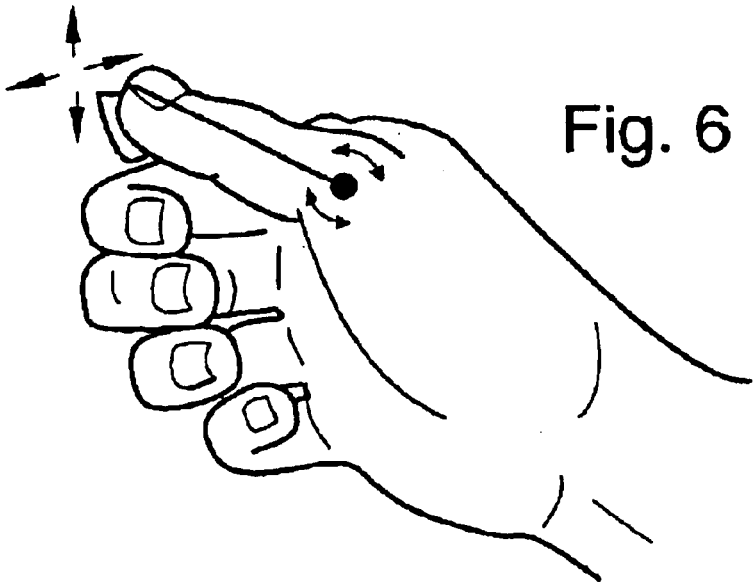
Fig. 6

Fig. 10A
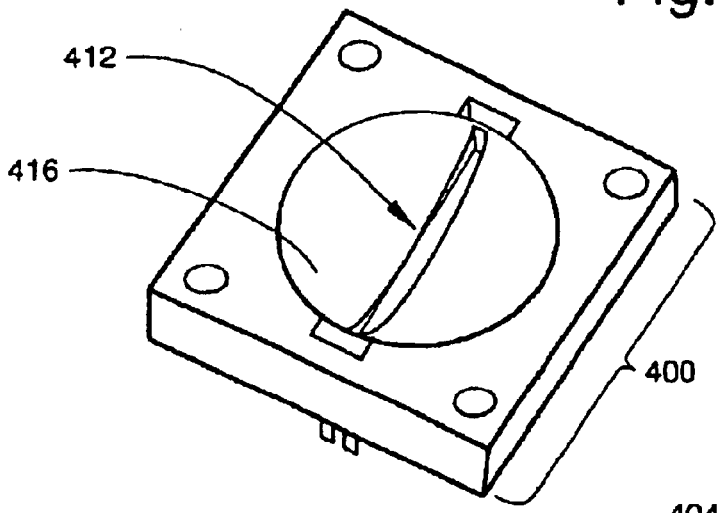
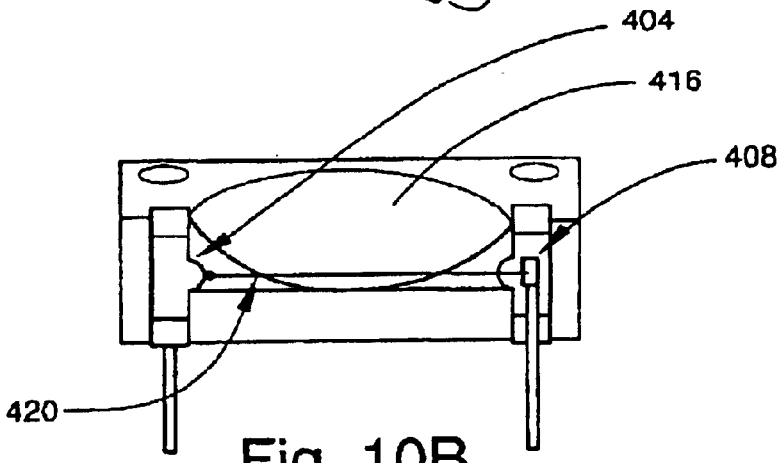
Fig. 10B
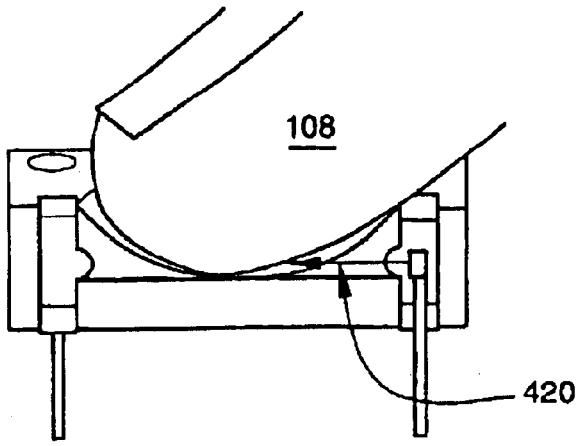
Fig. 10C

TOUCHPAD-BASED POINTING DEVICE
INTERNAL CIRCUITRY BLOCK DIAGRAM

TRACK BALL-BASED POINTING DEVICE
INTERNAL CIRCUITRY BLOCK DIAGRAM

THUMB ACTUATED X-Y INPUT DEVICE

Matter enclosed in heavy brackets [ ] appears in the original patent but forms no part of this reissue specification; matter printed in italics indicates the additions made by reissue.

FIELD OF THE INVENTION

This invention relates to a computer input device. More specifically the present invention is an ergonomic hand controller pointing device with functionality that enables it to replace current pointing devices such as a mouse or a digitizer pad. The present invention is less taxing to the user to minimize fatigue even during a protracted period of continuous use.

BACKGROUND AND DESCRIPTION OF THE PRIOR ART

Many computer applications require or accept input beyond the input of text from a keyboard. The types of input vary but the input can be broadly categorized as point and click. The pointing device couples an x-y position on the display with input from an actuator on the pointing device (although some computer keyboards have designated keys to duplicate some actuators for the pointing devices). Thus, an x-y position of a position icon on a display screen is combined with an input of some type from the actuator in order to select something such as a command or menu choice from a series of such choices, a piece of text, or a drawing element. This selection is known as a "point and click" operation. Thus, input devices used for this sort of input are often called "pointing devices". Often the act of selection can be coupled with one of several command choices from one or more actuators on the point device. Sometimes these commands are a sequence of selection indications from an input so that a single click, double click and even a triple click can convey different requests. Sometimes maintaining pressure on an actuator is interpreted as a different command, for example a drag instead of a click. Sometimes alternative input actuators on the pointing device are used (so that a right click from an actuator typically on the right side of the pointing device is processed differently than a left click). In some cases, some input commands are relatively insensitive to the specific position of the position icon on the computer display such as in applications that allow a "right click" to bring up a menu or frequently used commands that are relevant to the current state of the application. Such a pointing device can be used to input commands into a wide range of applications including those operating on distributed computer terminal workstations, personal computers, games and amusement devices, and other equipment with need for user input.

One such printing device is the mouse, which is moved by the user's hand across a work surface such as a desktop. Some mouse pointing devices need or benefit from moving the mouse over a special mouse pad located on the user's desktop. The movement of the mouse is detected and communicated to the computer so that an indicator on the display screen moves. The position indicator can be something simple such as cursor, a cross hair or a more fanciful indicator ranging up to a cartoon character. For sake of simplicity, we shall call this symbol a position icon. With practice, the user can move the mouse to move the position icon over various choices, text, or locations so that one or more movements of the user's fingers can couple an input command with the location choice to make a request to be acted upon by the computer application.

The invention of the mouse is attributed to Doug Englebart as part of work done for NSA in the mid 1960's. While the mouse was a large improvement over other pointing devices such as light pens, the repetitive motions required to place the position icon in the desired location and the movements to couple an input command with the selected location have been linked with repetitive motion injuries to some computer users. The problems are particularly acute among users who use a mouse pointing device frequently as is the case with people who use such a device as part of their occupation. The unresolved problems from use of the mouse and alternative prior art pointing devices is discussed in more detail below.

In light of the popularity of the mouse as a pointing device since its invention in the mid-1960s, and the recurrent problems of repetitive motion injuries, there have been many attempts to improve the device to account for the interaction between the mouse or mouse alternatives and the human body. This trend has continued as interaction with computers in certain applications such as computer aided drafting or browsing the World Wide Web portion of the Internet may require many point and click operations and very few text input operations, thus increasing the importance of the mouse design in minimizing repetitive motion injuries. The improvements have refined the initial design but do not eliminate the adverse effects of repetitive use. A brief description of selected attempts to improve the mouse is included below.

U.S. Pat. No. 4,862,165 for an Ergonomically—Shaped Hand Controller issued in 1989. The '165 patent reviews the prior art designs for hand controllers or mouse devices and finds that the shape of the prior art mouse was not ergonomically compatible with the user's hand. The proposed solution is an alteration to the outer housing of the mouse which is asserted to be ergonomically shaped to minimize hand muscle fatigue even during protracted periods of continuous use.

U.S. Pat. No. 5,287,090 for a Combination Mouse and Track Ball Unit was issued in 1994. The '090 patent asserts that the combined mouse/trackball device of the '090 patent particularly reduces the onset and severity of or can prevent entirely repetitive strain injuries, and other neurological or orthopedic malfunctions such as tendonitis and tenosynovitis that are commonly related to usage of a flat and rectangular-type mouse. The '090 device may operate as a trackball, as a right handed mouse or a left handed mouse. In brief, the device had a track ball that protruded through the bottom of the device to act as an input when in mouse mode and also protruded through the face of the device distal to the arm of the user to serve as a thumb operated track ball. When operated as a mouse, the user moves the mouse to indirectly turn two slotted wheels positioned at right angles to one another to provide input to move the position icon. The '090 device uses a pair of V-shaped switch plates (best shown in '090 FIG. 5) which actuate microswitches located below the switch plates to convey as input command from the user. Thus, operation in mouse mode to supply the x-y input called for gross motion of the mouse using the various muscles in the arm to move the hand.

When the user chooses to move the '090 device to trackball mode, several "bullet switches" are caused to extend from the device to lift the mouse movement detector from the surface of the desk. The trackball mode required manipulation of the trackball with the thumb of the user.

U.S. Pat. No. 5,414,445 for an Ergonomic Pointing Device assigned to Microsoft Corporation was issued in 1995. The '445 patent asserts that by enlarging and modifying the shape of a mouse that the user's fatigue will be decreased through positioning the user's lower palm on a work surface such that the user's hand plane is supported by the pointing device and the user's fingers are placed in a neutral posture to control the keys on the device without the need to compress or reach. The '445 patent notes that every user is different in physical size and physical proportions and suggests that the solution is a one that does not force user's into a tightly defined "grip architecture".

U.S. Pat. No. 5,530,455 for a Roller Mouse for Implementing Scrolling in Windows Applications assigned to Mouse Systems Corporation issued in 1996. The '455 patent adds a roller to the mouse on the top front of the mouse so that the roller is within finger reach of the three input control switches. The mouse is used in a conventional way to provide x-y input to move the icon on the display. Operation of the roller moves the displayed image in the y direction on the display ("scrolling"), of if the thumb is depressing a "shift" key the movement of the roller causes the displayed image to move in the x-y direction ("panning").

U.S. Pat. No. 5,570,112 for Ergonomic Computer Mouse issued in 1996. The '112 patent teaches changing the mouse design from a hard outer housing to a soft foam rubber pad intended to support the wrist and palm of the user in comfort. The rubber pad is covered by a thin fabric material and otherwise operates as a conventional mouse.

U.S. Pat. No. 5,576,733 for Ergonomic Computer Mouse issued in 1996. The '733 patent attempts to minimize fatigue, discomfort and pain from sessions of extended mouse use by changing the orientation of the user's hand from generally parallel to the desk or work surface to a generally upright hand with the four fingers of the user's hand in extended but slightly bent positions in a generally upright stack with the thumb supported on the opposite side of the mouse.

U.S. Pat. No. 5,726,683 for Ergonomic Computer Mouse assigned to Midas Mouse International Pty issued in 1998. The '683 patent teaches a mouse with a smooth hard, curved housing that allows the mouse to be gripped with the ring and little finger on one face of the mouse opposing the thumb on the opposite face. The index and middle finger are curved over the top and front face of the mouse where the one or more buttons are located. While the applicants for the '683 patent assert that it is measurably superior to other commercial mouse products as indicated by EMG activity level studies, the mouse requires an x-y motion of the hand to effectuate an x-y input as do other prior art mice.

Other Pointing Devices

U.S. Pat. No. 5,543,590 for an Object Position Detector with Edge Motion Feature assigned to Synaptics, Incorporated issued in 1996 as one of several related patent applications arising from an application field in 1992. The '590 patent describes an input pad for receiving x-y input and tap signals as an alternative to a mouse type device. As it is a capacitance sensing system, the sensing mechanism does not require that the user actually touch the surface of the touchpad in order for the mechanism to sense the user's finger. The patent asserts that this feature can be used to reduce strain on the user. The text of the patent (such as column 27) describe the implementation of a "glide" feature whereby a user can slide the user's finger onto one of the outer edges of the pointing device to input a "glide" command to have the position icon move in the indicated direction as long as the user's finger remains in this perimeter position. Thus the touchpad effectively has an x-y input zone for translating movements of the finger tip into x-y movements of the icon on the displayed image, and several predefined "edge motion" glide input zones for the user to input an ongoing request for continued movement of the icon in any of the corresponding directions as long as the user's finger remains in the glide input zone.

U.S. Pat. No. 5,748,185 for Touchpad with Scroll and Pan Regions assigned to Stratos Product Development Group issued in 1998. The '185 patent teaches the use of a cursor control region, a scroll control region, and a pan control region, defined as separate areas in a touchpad. Movement of the contact point in the cursor control region causes movement of the cursor in the graphical user interface. Movement of a contact point in a scroll control or pan control region causes scrolling or panning respectively of the workspace in the Graphical User Interface (GUI).

U.S. Pat. No. 5,943,052 for Method and Apparatus for Scroll Bar Control assigned to Synaptics Incorporated issued in 1999. It teaches the use of a scroll zone having a central axis defined on a touchpad. The patent teaches the use of software to scroll the information in an active window owned by the operating system or software application. The software is adapted to not scroll based on finger input that is not substantially parallel to the axis of the scroll zone.

U.S. Pat. No. 6,031,518 for Ergonomic Input Device assigned to Microsoft Corporation issued in 2000. The disclosed device is like a mouse in that it is a pointing device to be placed on top of the work space and is shaped to accommodate the geometry of the hand and fingers. Unlike a mouse, it does not require x-y motion of the mouse to effectuate an x-y motion of the position icon on the display. The actuators on this device are: a track ball positioned to be manipulated by the index finger, keys positioned to be operated by the thumb, and a scrolling wheel positioned to be operated by the middle finger. As shown best in FIG. 3, the device of the '518 patent continues to place the hand wrist down on the table with fingers pivoted upward to operate the various actuators.

Thus, while there have been many incremental improvements to the mouse device as well as a search for mouse alternatives such as devices employing touchpads, there are longstanding and previously unsolved problems with prior pointing devices.

Problems Associated with Prior Art Solutions

Applicant hereby incorporates by reference the following articles and will subsequently refer back to these references as REF1 through REF7, respectively.

REF1: Repetitive Motion Disorders statistical graph based on Bureau of Labor Statistics—University of California, San Francisco and University of California, Berkeley Ergonomics Program 1999

REF2: Table 3. Number and Percent of nonfatal occupational injuries and illnesses involving days away from work involving repetitive motion by selected worker and case characteristics 1997—U.S. Department of Labor—Bureau of Labor Statistics April 1999

REF3: Computer Related Symptoms: A Major Problem For College Students page 2 of 6 statistical graph FIG. 1: Discomfort Intensity Rating For Each Body Part—Erik Peper, Ph.D. and Katherine H. Gibney Institute for Holistic Healing Studies, San Francisco State University Sep. 4, 1998

REF4: Pointing Device Summary—Pete W. Johnson, Ph.D. University of California, San Francisco and University of California, Berkeley Ergonomics Program Jul. 18, 1994

REF5: Computer Workstation Self-Audit Checklist page 3 of 4, paragraph 1—Pete W. Johnson, Ph.D. University of California, San Francisco and University of California, Berkeley Ergonomics Program Jul. 18, 1994.

REF6: Ergonomic Guidelines for Arranging a Computer Workstation—10 Tips for Users Professor Alan Hedge, Ph.D., M.Erg.S., A.F.B.Ps.S. Cornell University—Department of Design & Environmental Analysis Ergonomics Research Laboratory Feb. 6, 1999.

REF7: Hand/Wrist Basics—Ten Things You Should Know About Hand and Wrist Pain Chris Grant, Ph.D., Certified Professional Ergonomist—F-One Ergonomics Ann Arbor, Mich. September 2000

The growing occurrence of computer-related conditions such as repetitive stress injury (RSI), tendinitis, bursitis and carpal tunnel syndrome is a serious problem. If not remedied, these injuries to the hands, wrists, arms and shoulders can become permanently debilitating. According to the Bureau of Labor Statistics (BLS), repetitive motion disorders in American office workers have doubled between 1987 to 1997. (See REF1) In 1997, over 11,000 people were reported to have missed work due to computer-related ailments. (See REF2) However, the number of unreported cases and workers who endured the pain on the job is likely much higher than that figure. Unfortunately, office workers are not the only group of computer users at risk.

The growing requirements for students to use computers is also taking a toll. A recent study conducted by Dr. Erik Peper, Ph.D. of San Francisco State University indicated that 30 percent of the university's students suffer from intense hand and wrist discomfort as a result of using computers for schoolwork. (See REF3). Additionally, the BLS suspects that home computer and Internet users are at risk for similar problems, but as yet no data is available.

Public awareness of computer-related injuries is growing. This awareness is emphasized by a recent government drive to reduce RSI in the workplace, including those related to computer use. In 1996, the Occupational Safety and Health Administration (OSHA) established a standard requiring employers to minimize recurrent repetitive stress problems at work (including office work). On the state level, California has passed laws to increase employer responsibilities further, and several other states have followed suit.

It is well known that using a computer mouse causes a large proportion of the repetitive stress injuries among computer users. Public concern about mouse-related injuries has spurred a new market in ergonomically alternative pointing devices. New government pressures on employers is also fueling this market growth. As a result, Internet and retail stores are promoting a variety of "ergonomic" pointing devices. Most of these devices represent only minor variations of conventional designs, however, and are of limited benefit to computer users subject to repetitive stress injuries.

Ergonomic Problems Associated with Pointing Devices

The nation's leading experts in computer ergonomics recognize several major pointing device problems that contribute to repetitive stress disorders. Although some of these problems overlap, they can generally be attributed to eight different ergonomic factors. These eight factors include arm/wrist movement, device placement, small muscle/tendon movement, joint position, small exertions, muscle tension, body posture and localized pressure. The following subsections describe each factor as it relates to popular pointing devices.

1. Arm/Wrist Movement

Pete W. Johnson, Ph.D., of the University of California at Berkeley and the San Francisco Ergonomics Lab in Richmond has found that conventional mouse use causes shoulder pain and injury in computer users. He attributes the distress to the repetitive arm movements that slide the mouse around the mouse pad. Dr. Johnson has found that shoulder problems are reduced with the use of stationary pointing devices such as trackballs. (See REF4 at page 2)

2. Device Placement

The placement of a pointing device relative to the user is recognized as an important factor in computer ergonomics. Professor Alan Hedge, Ph.D., of Cornell University's Department of Design and Environmental Analysis Ergonomics Laboratory emphasizes the need to keep the pointing device in a comfortable, convenient location. He says it is important in the prevention of repetitive stress disorders to keep the wrist straight and the arm close to the body. (See REF6 at pages 3 and 5). Additionally, Dr. Johnson has found that repetitive stress problems are reduced when the device is operated near the centerline of the body and no higher than the keyboard. He warns, however, that many computer workstations do not provide a safe space in which to operate the device. (See REF5) Overreaching for a poorly located pointing device is a common problem among computer users, he notes. Unfortunately, nearly all mice and trackballs are desktop devices that are operated on whatever surface the work area allows. Ideally, the hands should rest easily in the lap as much as possible.

3. Small Muscle/Tendon Movement

Some devices that minimize arm and wrist movement do so at the expense of the small muscles and the flexor and extensor tendons that work the fingers. Typical trackball devices are arranged so that the thumb or forefinger (also known as index finger) must make a kicking motion to rotate the ball and send the cursor vertically across the screen. With this kicking motion, joints are repeatedly over flexed, applying undue stress and friction to tendons and joints. Dr. Johnson discourages the use of thumb-oriented trackballs for this reason. (See REF4 at page 2). Kicking also requires the greatest amount of flexor and extensor tendon travel through the carpal tunnel, which can initiate or aggrevate carpal tunnel syndrome.

4. Joint Position

Joints, muscles and tendons experience stress and fatigue when held in unnatural positions for extended periods of time. Chris Grant, Ph.D., of F-One Ergonomics in Ann Arbor, Mich., attributes many stress problems to "non-neutral" joint postures. As a solution, Dr. Grant has found it best to keep wrist and finger joints positioned near the center of travel. (See REF7 at page 2).

According to Dr. Johnson, using desktop devices such as mice and trackballs encourage undesirable wrist extension. (See REF4 at page 2) This unnatural stretch puts harmful stress on joints, tendons and the sensitive carpal tunnel. Further compounding the problem, most mice keep fingers extended well beyond their natural position. In general, any repeated, awkward reaching or bending will cause problems in the body. Additionally, Professor Hedge emphasizes the need to keep the elbow at a right angle or straighter to prevent compressing the nerves near the joint. (See REF6 at page 3). Unfortunately, most pointing devices are desktop-operated and often keep the elbow at a less desirable, acute angle.

5. Small Exertions

Dr. Grant has found that sudden, little exertions can damage small muscles and tendons and should be avoided or minimized. (See REF7 at page 2). Even the repeated force of clicking or holding mouse buttons should not be ignored. With today's graphical, mouse-oriented computing environment, injuries from excessive clicking and dragging operations have become a serious problem. To reduce soreness in fingers and tendons, Dr. Johnson recommends using a mouse that requires the least amount of activation force to clock and hold the buttons. (See REF4 at page 2).

6. Muscle Tension

Constant muscle tension in the hands, arms and shoulders is another serious contributing factor. Dr. Hedge and Dr. Grant stress the benefits of keeping limbs and shoulders as relaxed and loose as possible. (See REF6 at page 3 and REF7 at page 2). The design of many mice and trackballs encourage gripping the device to better control the cursor. For this reason, Dr. Johnson urges users to let go of the device when not navigating. (See REF6 at page 5). Any pointing device should be held lightly when in use. Ideally, the experts agree, the hand should be in a neutral, relaxed position as much as possible between and during input actions.

7. Body Posture

Good posture is the basis of ergonomic computer use, according to Professor Hedge. (See REF6 at page 3) A good sitting posture is not stiff, but balanced and relaxed. Good posture minimizes prolonged stresses in the body, especially where skeletal support muscles are involved. In practice, however, many mice and trackballs are situated to encourage the user to slump or lean forward when reaching for them.

8. Localized Pressure

Dr. Grant stresses the importance of minimizing pressures localized to small parts of the body. He especially urges users not to support their wrists or elbows on edges or smaller surfaces. He advises against trying to offset the drawbacks of desktop pointing devices by using wrist rests. (See REF7 at pages 2 and 4) Wrist rests tend to apply pressure to the soft underside of the wrist compressing nerves together with moving tendons. Such a situation can easily compound repetitive stress problems.

Ergonomic Problem Summary

In summary, computer ergonomics experts agree them mouse-user interaction needs to be improved to reduce the stresses and irritation associated with repetitive-motion injuries. A more relaxed and natural hand and wrist position, minimal motion in the arm, wrist and fingers, and minimal button activation (or "clicking") pressure are essential properties of a truly ergonomic pointing device. Reaching should be eliminated altogether. Shoulder and arm stresses can be reduced by using a stationary pointing device that is centrally located close to the body. A lower, centralized location encourages the most beneficial body posture and reduces elbow bend and related nerve pinching. Ideally, users would sit and work with their hands relaxed and partially open in the lap.

SUMMARY OF THE DISCLOSURE

It is, therefore, an object of this invention to provide a pointing device that is easier and more comfortable to use than existing pointing devices. It is another object of this invention to provide a pointing device that will minimize any fatigue experienced by the user.

It is an object of this invention to eliminate the need for repetitive arm movements to move the pointing device in order to control the x-y position of a position icon on a computer display.

It is an object of this invention to allow the user to place the pointing device in a comfortable convenient location including a location with the wrist straight, arm close to the body, and preferably with the hand resting easily in the user's lap.

It is an object of this invention to provide a pointing device that does not overwork the small muscles and the flexor and extensor tendons of the fingers such as occurs in the kicking motion to rotate a trackball to move the position icon a large amount on the display screen.

It is an object of this invention to avoid the imposition of stress and fatigue on joint muscles and tendons attributed to maintaining "non-neutral" joint positions.

It is an object of this invention to use actuators in the pointing device that require less activators force to "click" or hold than the activators found in prior art mouse devices.

It is an object of this invention to develop a pointing device that can be used by users with a variety of hand sizes.

It is an object of this invention to develop means for adjusting the pointing device to increase the range of hand sizes that can comfortably use a particular size of the pointing device.

It is an object of this invention to provide a pointing device that avoids the imposition of constant muscle tension in the hands, arms, or shoulders of the user by allowing the user to hold the pointing device in a neutral, relaxed position as much as possible.

It is an object of this invention to provide a pointing device that does not encourage placement on a desktop such that the user must lean forward, stretch or reach to use the pointing device.

It is an object of this invention to minimize the pressures localized to the wrist when using the pointing device.

These and other advantages of the present invention are apparent from the detailed description that follows.

BRIEF DESCRIPTION OF THE DISCLOSURE

The present invention takes the functionality of a mouse-type pointing device and places these functions in a pointing device that avoids the various demands on the user's body as described above. The net effect is to minimize the harmful, and repetitive shoulder, arm, hand or finger movements associated with the use of most computer pointing devices. The present invention is an entirely new pointing device that takes advantage of existing technologies to help avoid many irritating aches, pains, and ailments associated with other pointing devices. Rather than being slid around on a mouse pad or being restricted to desktop use, the present invention is designed to be used with the hand resting in the lap so that the hand, while the wrist and arm remain in a natural and comfortable stationary position.

In the present invention, the housing or shell of the device comprises an upright, rectangular portion that extends upward from a horizontal grip-shaped main body portion.

The upright portion of the device presents an x-y input sensor to the user. This x-y input sensor may be a trackball, touchpad or other device with similar function. The user hold the device by wrapping fingers around the main body portion with the thumb on top extending forward toward the upright portion of the device. The x-y input unit is controlled with light movements of the thumb tip. The index and middle fingers rest in grip-like channels on the bottom of the main body. (Note, the middle finger is sometimes called the second finger). These channels contain zero-force touch switches that act as left and right mouse buttons for the two fingers.

In a preferred embodiment of the invention, a third touch switch located near the thumb causes the first two touch switches function like a scroll wheel found on the typical modem computer mouse. Thus, the user can efficiently scroll through windowed computer applications. Electronic auditory or vibratory feedback alerts the user to touch switch activation thereby giving the zero-force switches a simulated tactile feel.

Also in the preferred embodiment, a unique wedge-shaped fin protrudes upward from the side of the main body of the device. This fin fits comfortably into the user's palm beneath the thumb to stabilize the device and to accommodate varying user hand sizes.

The present invention, hereinafter "pointing device" is best suited to graphically-oriented computer use wherein the "point", "click", "drag" and "scroll" operations associated with computer input devices consume more time than direct, keyboard text editing. Such uses may include graphically oriented programs for design, drafting, art, and programming. Other uses include, but are not limited to, operations with navigation and selection primarily by point and click, such as navigation and use of Internet sites and providing input applications such as web based television. For activities with significant input via the keyboard, a desktop mouse may be simultaneously connected through the computer's serial port or universal serial bus port for convenience, so that the hand does not need to move repetitively from lap to desktop and back. As shown in FIG. 1, a hand placed in a lap naturally assumes a stress-free, open-grip posture with the thumb pointing forward at the top.

The pointing device makes the best of the body's natural tendencies. Its shape fits the contours of the hand when relaxed in the lap so that no joints or tendons are stressed. Use of the present invention allows the elbow to rest at a preferably obtuse angle close to the body without constantly having to reach for a desktop device. There is no stress to the wrist from over extending, and a more upright body posture is naturally encouraged. The arm and hand are supported comfortably in the lap to reduce the various stresses associated with holding mice, trackballs and touch pads that rest flat on a desktop. Since the device is operated from the lap, users are not adversely impacted by limited desk space.

BRIEF DESCRIPTION OF THE DRAWINGS

FIG. 5 shows the undesirable flexural motion of the thumb required to achieve vertical cursor motion with a trackball placed beneath the thumb pad.

FIG. 6 illustrates the concept of pivotal motion of the straightened thumb translating to lateral motion of the thumb tip in contrast to the flexural motion of FIG. 5.

FIG. 10 illustrates one embodiment of a touch switch implemented using infrared light source and infrared light sensor.

DETAILED DESCRIPTION OF THE PREFERRED EMBODIMENT

The preferred embodiment of the invention comprises a plastic housing, a cursor navigation unit for x-y input, three small switches or buttons and internal electronics and cable with which to interface the device with a computer. The plastic housing is to be cast and constructed using methods and materials known to the pointing device industry.

The particular preferred embodiment of the invention shown in the accompanying figures and related text is configured for use with the right hand. However, it can be understood that the invention can be configured for use with the left hand by production of a device that is a mirror image of the device shown. Furthermore, the present invention is limited to the physical configuration of the pointing device and the way the various input actuators are placed in juxtaposition to the fingers to minimize fatigue. The electrical, electromechanical, and software interfaces necessary to convey the input signals to a computer application are well known in the art. To the extent that minor variations are necessary from existing device interfaces to create the necessary software interface (driver), and to integrate a pointing device as described below with computer systems, such a variation can be done by those of suitable training and experience without undue experimentation.

In order to promote clarity in the description, common terminology for components is used. The use of a specific term for a component suitable for carrying out some purpose within the disclosed invention should be construed as including all technical equivalents which operate to achieve the same purpose, whether or not the internal operation of the named component and the alternative component use the same principles. The use of such specificity to provide clarity should not be misconstrued as limiting the scope of the disclosure to the named component unless the limitation is made explicit in the description or the claims that follow.

In order to provide orientation, the following convention will be used in this specification and the claims that follow: As held properly in the user's right hand, Top, when referencing a view indicates looking down on the user's thumb nail and the corresponding upward-facing surfaces of the device.

Front, when referencing a view indicates the view looking along the long axis of the main body or grip portion of the device and toward the face of the x-y input device.

Right, and left when referencing a view of the device correspond to the user's right and left sides when holding the device normally.

Bottom, when referencing a view indicates looking upward at the device from below as it is held by the user.

Back, when referencing a view indicates the view looking toward the device and facing the user, back view is the reverse of front view.

Figure 1:
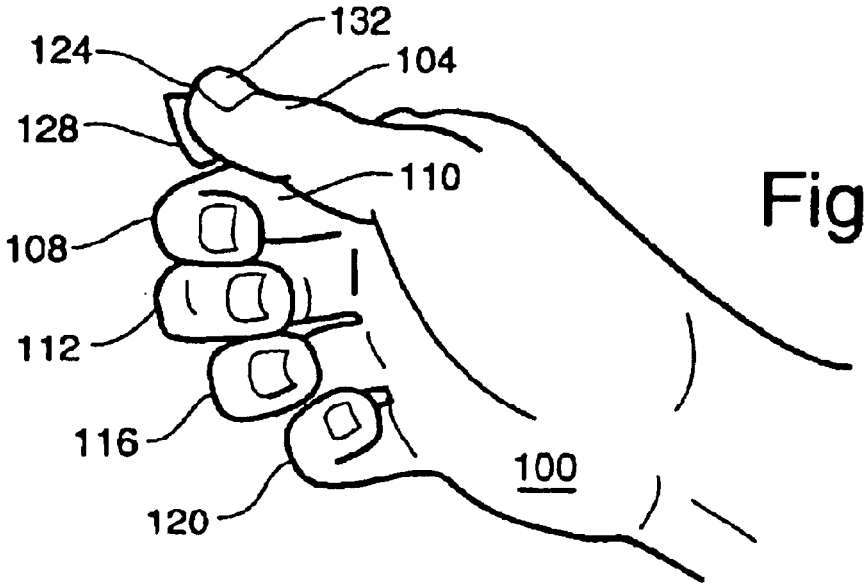
FIG. 1 is an illustration of a user's hand in a stress-free, relaxed open grip posture.

Returning to FIG. 1, the hand 100, has thumb 104, index finger 108, middle finger 112, ring finger 116, and little finger 120. The hand as depicted in FIG. 1 is in a stress-free, relaxed open grip posture with the thumb pointing forward at the top. A portion of the thumb, the thumb tip 124 is identified since the thumb tip will be used to provide input rather than the thumb pad 128. While the term fingertip is sometimes used to refer to any portion of the finger beyond the last digit joint, in this application, the term pad is used to refer to the surface opposite from the finger nail or thumb nail. The term tip is used to refer to the portion of the thumb or finger that is the distal surface of the finger or thumb which is located to distal and above the corresponding pad and just below the corresponding nail such as thumb nail 132. While there is not a clear line of demarcation between the thumb pad 128 and the thumb tip 124, the distinction is useful for describing the interaction between the thumb 104 and the present invention. In FIG. 1, the finger tips for the four fingers are visible, however, all or the majority of the pads for the four fingers are not visible.

Figure 2:
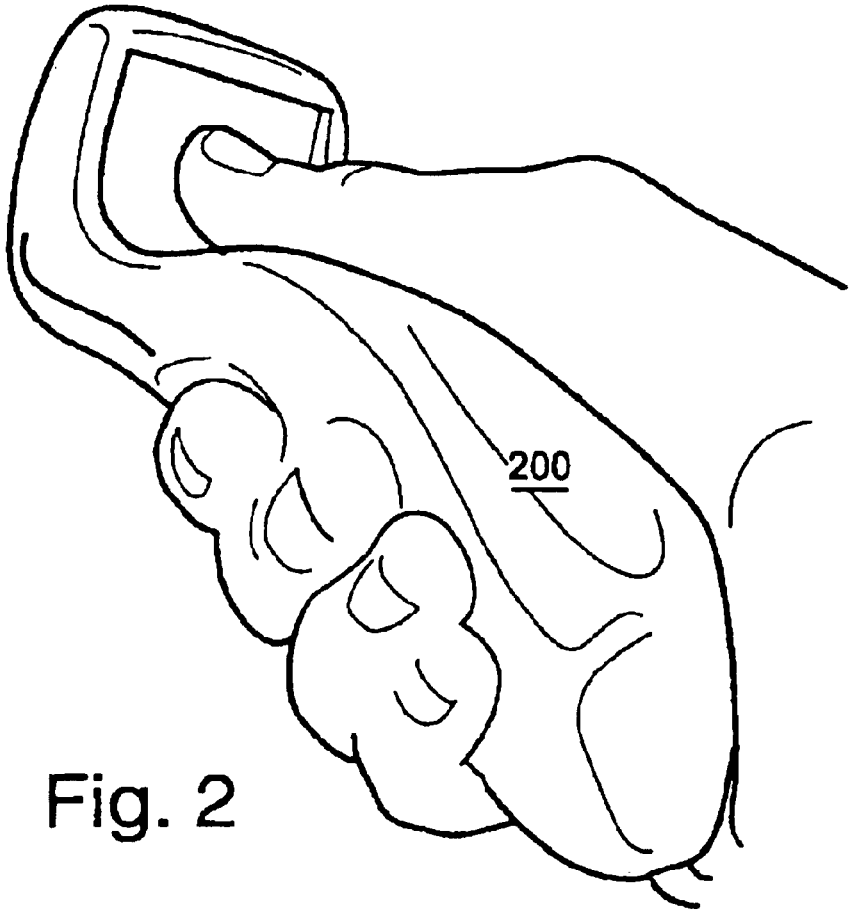
FIG. 2 shows a first embodiment of the present invention pointing device as held by a user.

FIG. 2 shows a pointing device 200 in the hand 100 of a user. Notice that the positioning of the hand, thumb and fingers is very much the same in FIG. 2 as isshown in FIG. 1.

The fingers curve around the 'grip' portion of the device. The index finger 108 and middle finger 112 are positioned in grip-like shallow troughs or channels that orient the device properly in the hand and position the pads of those fingers over the 'mouse button' like switches. These mouse-button switches, or components thereof, may be constructed to slide a short distance within each channel to accommodate variations in finger length. The remaining two fingers (ring finger 116 and little finger 120) gently wrap around the device to support it against the palm leaving the index finger 108, middle finger 112 and thumb 104 free to operate the controls.

In the preferred embodiment of the present invention, the housing or shell of the device comprises an upright or vertical, rectangular x-y input portion 206 that extends upward from a horizontal, somewhat grip-shaped main body portion 214.

The x-y input portion of the device 206 is a flat, rectangular box rimmed on the front with a rectangular bezel that frames a rectangular touchpad. The overall width and height of the x-y input portion 206 are governed by the dimensions of the touchpad used. The touchpad is oriented with its x-axis horizontal and its y-axis vertical. The x-y input portion 206 is between 0.5 cm. and 3 cm. thick depending on the range of position adjustment provided for the touchpad. Extending through the back of the x-y input portion 206 are three adjustment screws positioned in a triangular arrangement. (see FIG. 18) These screws provide the user with some fine adjustment to orient the touchpad to the user's thumb.

The x-y input portion 206 is approximately 8-cm. wide and 7 cm. tall including the contiguous lower back end of the main body. The size and shape of the x-y input portion may be varied to accommodate different touchpad sizes and may be concave to hold a curved or flexible touchpad used to better fit the arc of thumb-travel.

As viewed from the front, the main body 214 extends forward from the bottom of the bezel; conversely, the x-y input portion 206 extends vertically from the back end of the main body. The main body 214 is shaped to fit the contours of the user's right hand with the fingers curved together into a the open grip position shown in FIG. 1. In this position, the thumb is at the top and extends straight roughly 1.5 cm. above, and perpendicular to, the second bone of the index finger 110 (see FIG. 1). Also in this position, the thumb rests on the top surface of the main body 214 with the thumb tip 124 touching the bottom center of the touchpad. The bottom surface of the main body has a grip shape that bulges in the middle and that has channels defined by ridges. There is a molded channel 216 to position the index finger 108 and a molded channel 220 to position the middle finger 112 in a grip-like fashion. These finger channels are roughly 5 cm. long and lie nearly perpendicular to the length of the main body 214.

As viewed from above, the main body extends from the touchpad at an angle to the left of between 90 degrees and 115 degrees from the direction of the x-axis. As viewed from the right, the top surface of the main body 214 extends horizontally from the bezel approximately 4 cm., providing a surface for the thumb to rest on. It then gently arcs downward to blend with the lower front end of the main body 214. Overall, the middle of the main body 214 is approximately 5 cm. to 8 cm. wide with an average vertical thickness of approximately 3.5 cm., and the overall length is at least 10 cm. These dimensions may be varied to fit a wider range of hand sizes if needed.

Figure 11:
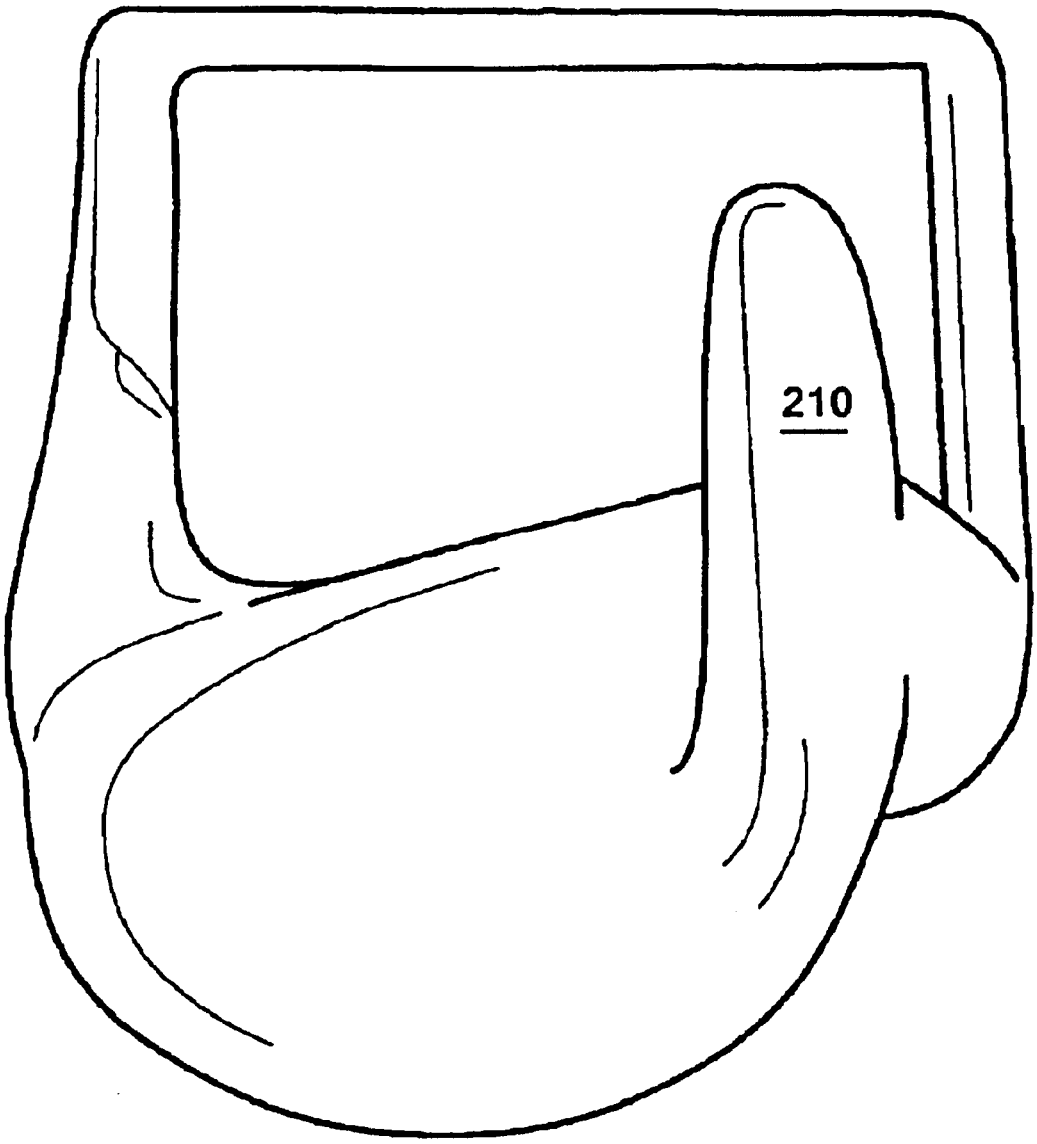
FIG. 11 shows another preferred embodiment of the present invention with a palm fin.
Figure 12:
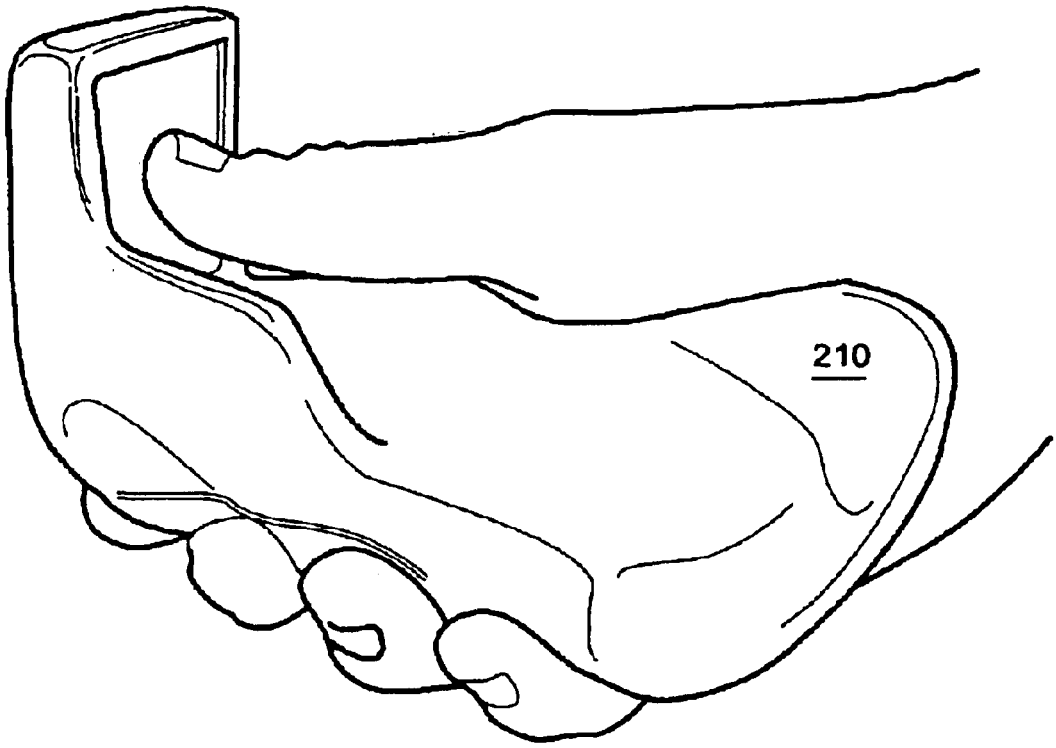
FIG. 12 shows a pointing device in accordance with the present invention as held by a user.

In a highly preferred embodiment, there is also a prominent, narrow fin protruding vertically from the upper right edge of the main body. (see FIGS. 11, 12, and 13) The fin 210 rises above the main body reaching an apex at the front end of the device. The palm fin 210 is shaped to fit against the palm beneath the arc of the "life line" or major crease in the palm where the thumb folds down over the palm.

This fin 210 helps to position the device properly in the hand and prevents the device from rolling out of position toward the palm. For this reason, the fin 210 provides stability so that the hand may remain relaxed, yet hold the device steady with the thumb and first two fingers remaining free to operate the controls.

A second function of the palm film 210 is to accommodate varying hand sizes. The tapered shape of the palm fin 210 allows a larger size hand to obtain the preferred open-grip posture. The wider hand will cover more of the taller portion of the fin thereby keeping the hand open enough so the longer fingers will not wrap too far around the main body. Conversely, a smaller, narrower hand will not extend as far up the tapered fin. The smaller hand will close sufficiently around a shorter portion of the palm fin 210 thereby retaining the desirable open grip as well. Thus, the fingers of various sized hands will wrap around the bottom of the main body 214 with fingertips positioned properly in the channels 216, 220 and with thumb tip 124 properly reaching the touchpad for comfortable navigation.

In this preferred embodiment, the fin 210 emerges from the upper right edge of the main body approximately 6 cm. forward of the touchpad and gently curves upward at an average angle of 60 to 80 degrees from the direction of the x-axis. This curved, top edge is at least 6 cm. long. The apex of the fin 210 is rounded with the 4.5-cm-long front edge turned downward to blend with the lower front edge of the main body. As viewed from the top, the fin 210 appears generally straight, but slightly convex on the right side, and it appears congruent with the right edge of the main body 214.

The size and position of the palm fin 210 or any other portion of the housing can be designed to be adjustable to better fit a variety of hand sizes, or the entire housing may be constructed in varying sizes to better accommodate the range in hand size and shape of the user population.

The pointing device is operated in a stationary position, which is in contrast to the way a mouse is moved in order to provide the x-y movement input. Thus, the user may position the pointing device where comfortable. The preferred method of use would place the user's hand in a comfortable position on the lap so that the weight of the hand is supported on a soft surface close to the user's body. Note that the pointing device would be useable in situations that would not work well with a mouse such as an airplane seat or standing during a presentation where a mouse and mouse pad would be difficult or impossible to use.

The Pointing Device

Figures 3, 4:
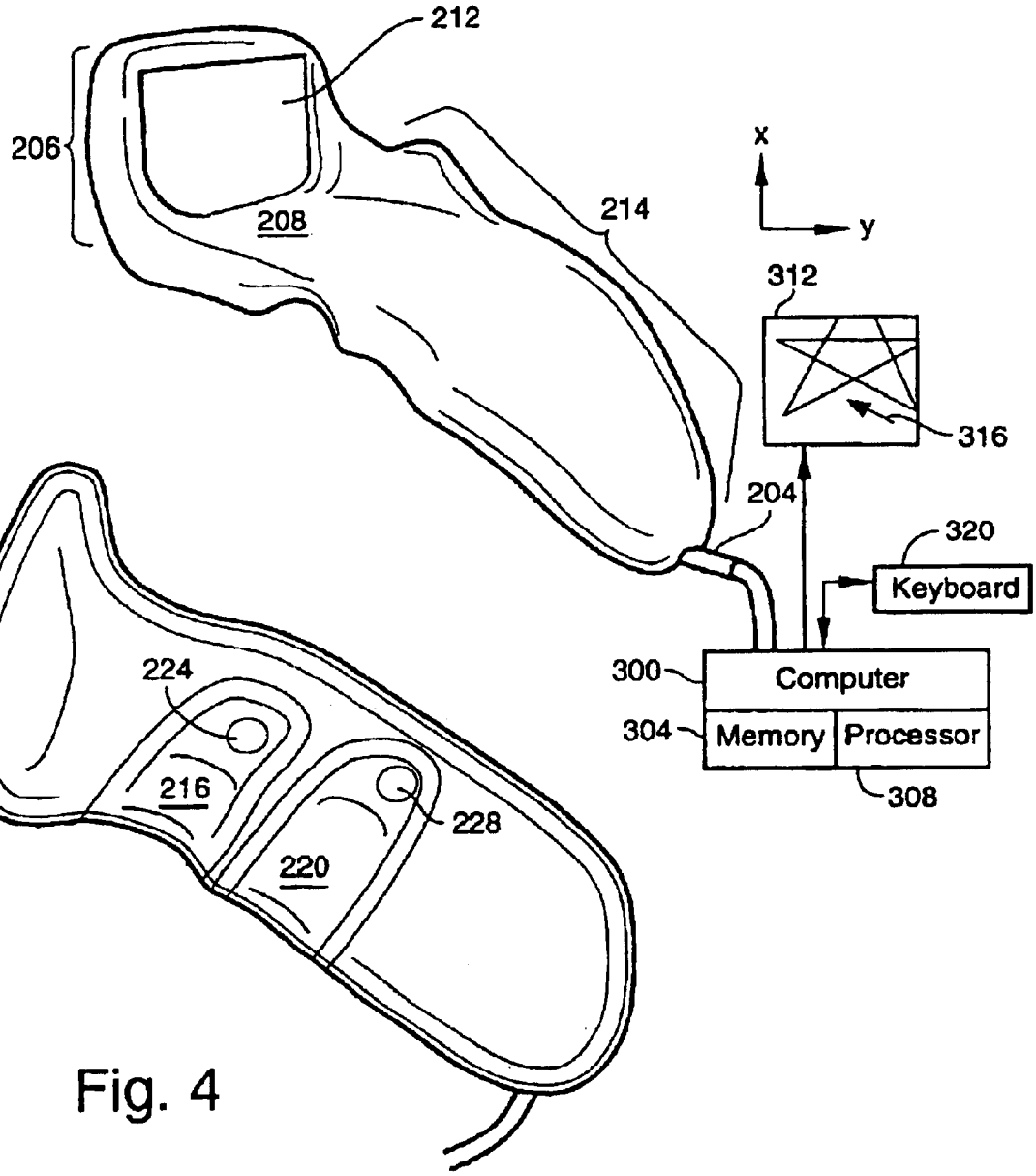
FIG. 3 shows the first embodiment of the present invention pointing device connected to a partial block diagram of a computer.
FIG. 4 shows the underside of the first embodiment of the present invention to show two of the zero force touch switches.

FIGS. 3 and 4 show one embodiment of a pointing device from two different views. Starting with FIG. 3, the pointing device 200 has internal components (not shown) which convert the user's input into electrical signals which pass through the cable 204 to connect directly or indirectly with a computer 300 through a suitable connection port such as a mouse port. While cable 204 is shown at the wrist end of the pointing device 200, this is not a restriction inherent to the invention as the cable 204 could exit from another part of the housing, including, but not limited to, the opposite end of the housing. The computer 300 having computer memory 304 and a computer processor 308. The computer 300 enables the display of a computer image 312 with position icon 316. As discussed above, the shape of the position icon can be any shape that is useful to indicate a precise point on the display screen. For a text based application, a cursor is sufficient. Other applications may use a cross hair as the position icon. The creation of the displayed image is handled by conventional hardware and software. Many computers use graphical user interfaces ("GUIs") which use windows in the displayed image. Portions of files can be viewed in the one or more windows of the displayed image.

In FIG. 3, the file providing the material being displayed contains an image of a five pointed star. With the magnification level being used, only a portion of the star fits in the window which is set to be the same size as the displayed image. The pointing device 200, like the prior pointing devices such as a mouse, can be used to provide user input to move the selected portion of the file towards the top or bottom of the file or for files that are wider than the current window on the display, the user can move the file to view material to the right or the left of the material displayed in the current window.

The computer is likely to have a keyboard 320 for the input of text. In some computer systems the pointing device 200 may be connected to the computer 300 through a connection in the keyboard 320.

FIG. 3 shows pointing device 200 without a hand. The pointing device 200 can be divided into two major portions a vertical platform 206 for mounting the x-y input device 212 and a fairly horizontal main body 214. The terms vertical and horizontal relate to the general orientation of the device when used in the manner shown in FIG. 2. Nothing within this patent constrains the user or the scope of the claims to a device that is being held at a given time in an orientation that puts the main body 214 with respect to the floor of the building or some other reference point. Further, while the terms vertical and horizontal are useful in pointing out and referencing the subcomponents of the housing body, the two sub-components need not form a 90 degree angle. One of the preferred embodiments has an angle between these two components of approximately 106 degrees which in this context is substantially perpendicular. The long axis of the main 214 will be substantially parallel to the axis of the extended thumb (see for example FIG. 12). The vertical platform 206 will be substantially perpendicular to the long axis of the main body 214.

In this case, the vertical platform 206 includes a flat, rectangular box rimmed on the front with a rectangular bezel that frames a rectangular touchpad FIG. 3 reveals the thumb platform 208 which provides a convertible home position for the thumb 104. As shown in FIG. 2, the thumb 104 is positioned so that with minor extensions the thumb tip 124 can contact the x-y input device 212. In the embodiment shown in FIG. 2, the x-y input device 212 is a touchpad. Alternative hardware for use in the x-y input device is discussed below.

As best seen in FIG. 4, the pointing device 200 has molded channels for index finger 216 and molded channel for middle finger 220 for the index finger 108 and middle finger 112, respectively. These channels help the user to instinctively position the device properly within the hand and to align those fingers with their intended "mouse button" switches. In the portion of the molded channel for index finger 216 where the pad for the index finger of a user would be, is a first zero force touchswitch for index finger 224. In the portion of the molded channel for middle finger 220 where the pad of the middle finger 112 of a user would be, is a second zero force touchswitch for middle finger 228. Zero force touch switch for middle finger 228 is also visible in FIG. 3. A scroll select touch switch 232 is located away from the thumb platform 208. The scroll select touch switch 232 is visible in FIG. 13.

The Use of the Thumb Tip.

Like the pointing device of the present invention, typical trackballs and touch pads are superior to mice because they keep the arm stationary and reduce the muscle work in the arm when compared with x-y sliding needed for x-y input in a traditional mouse. However, trackballs and touchpads cause unneeded small-muscle strain through compound finger motions. In typical trackballs and touchpads, the placement of the trackball or touchpad adjacent to the pad of the finger or thumb requires all of the digit's joints to be fixed to produce a single vertical cursor movement. Such flexural motion requires a complex combination of muscle and tendon movements. (See FIGS. 5a and 5b) The process shown in FIGS. 5a and 5b is awkward and requires excessive small muscle effort and tendon travel within the carpal tunnel. To highlight the complexity of the movement, arrows indicate the motion of various joints of the thumb.

For example, the finger or thumb being used to provide user input must be alternately flexed and extended in a cumbersome kicking motion to achieve vertical movement of the position icon 316 relative to the display image 312.

While FIG. 5 shows a trackball, the motion for a touchpad situated in a plane below the user's hand would be similar with the exception that the thumb would need to be at a more severe angle in order to make contact with the touchpad with the thumb tip 124 or at least the front portion of the thumb pad 128.

User input for vertical (y-direction) motion is a particularly common motion as most files, such as text files require much more y-axis navigation than x-axis navigation. While display screens are made sufficiently wide so as to allow a line of text to be displayed at magnification suitable for reading, the length of the text file is often 10 or even 1000 times longer than can be displayed at a legible magnification. Typically, even a one page letter for a standard sheet of office paper is longer than the text that fits within the displayed image of the text at standard magnifications. Thus the input from the user to move up and down the displayed image is perhaps the most frequently performed input motion.

In contrast, the pointing device according to the present invention uses pivotal motion of the thumb to position the cursor.(See FIG. 6.) While other devices have suggested the use of the thumb to provide input or suggested the use of the tip of the index finger to provide input, applicant's device teaches the use of the thumb tip 124. Although the tip of the thumb is not generally considered adroit, the anatomy of the thumb allows the precise movement of the straightened thumb in a x-y motion (pivotal). Thus, with practice, thumb tip 124 may be used for input with reduced fatigue and damage associated with extended use of other input devices using either the thumbpad 128 or the movement of the other fingers in flexural motions.

As shown in FIG. 6, the thumb 104 is held naturally straight as it would be at rest, and orbits easily in a more neutral position. If you try to replicate the motions shown in FIGS. 5 and 6 with your own thumb, you will notice that pivotal motion in FIG. 6 is fluid and natural even when moved in a diagonal line or in the shape of a circle. The gentler pivotal motion involves fewer joints with less tendon travel and employs thumb muscles located in the hand causing less tendon motion and stress within the carpal tunnel. The preferred embodiment of the pointing device uses a touchpad. However, an alternative embodiment of the pointing device can use a track ball as shown in FIG. 9.

Edge Motion Feature

The preferred embodiment of the pointing device has a feature that greatly reduces repetitive stroking with the thumb tip 124 when propelling the cursor across the screen. At the end of the thumb stroke, pointing device 200 allows the user to continue movement of the position icon 316 effortlessly in any of the predefined directions.

Figure 7:
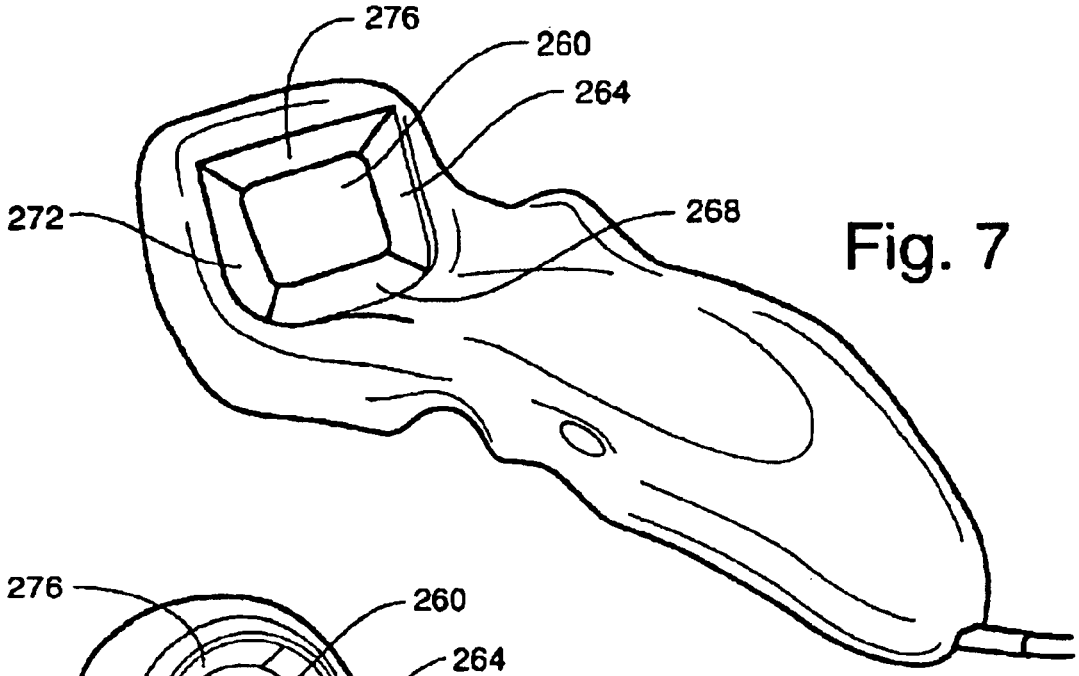
FIG. 7 illustrates one embodiment of the present invention with input areas for edge motion surrounding a touchpad.
Figure 8:
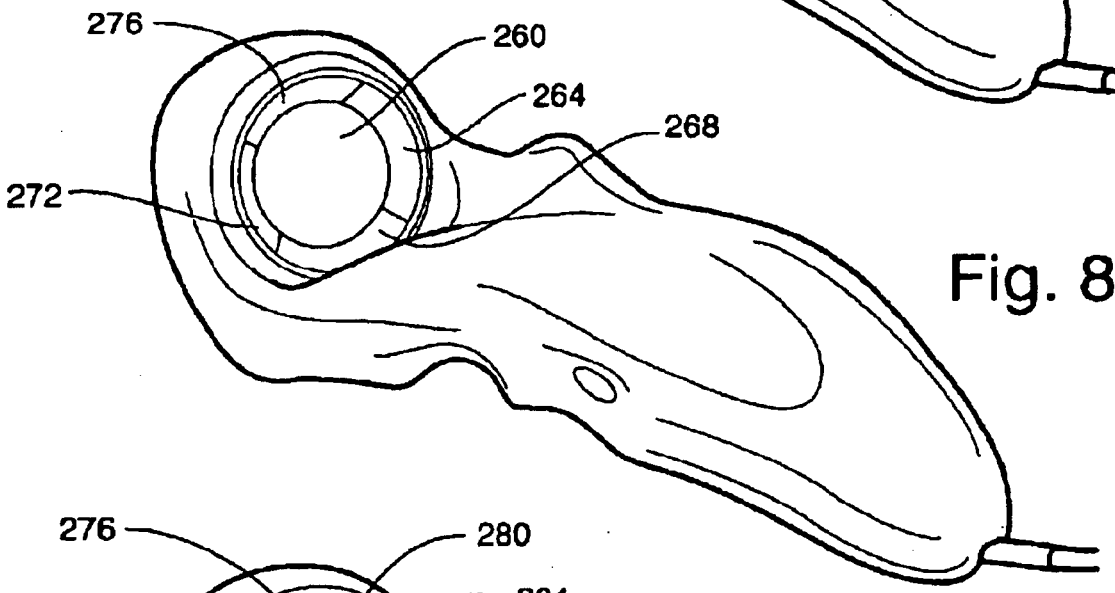
FIG. 8 illustrates one embodiment of the present invention with edge motion buttons around a round touchpad.
Figure 9:
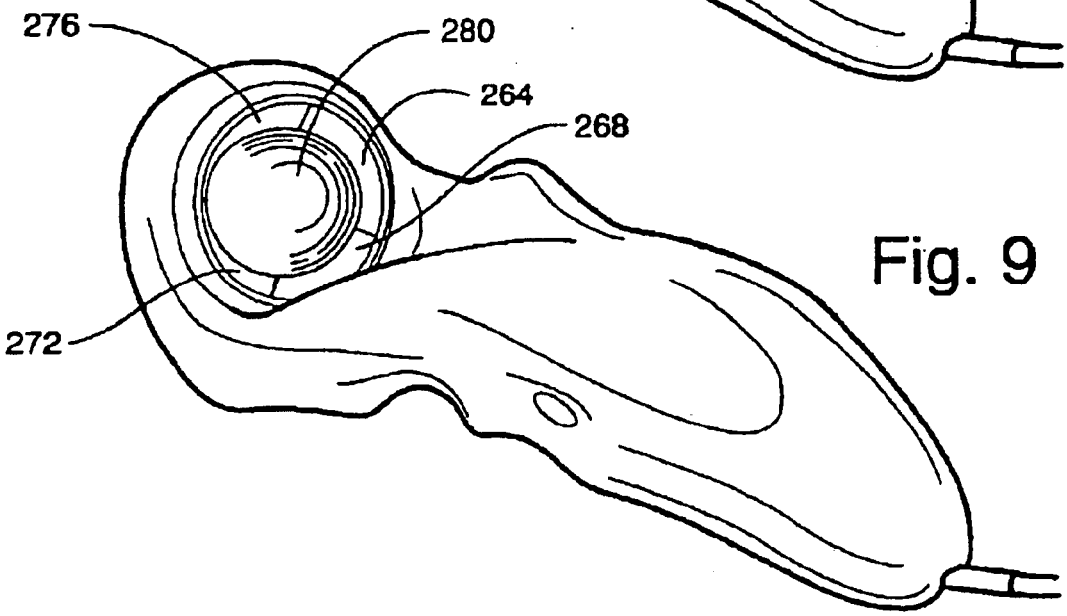
FIG. 9 illustrates one embodiment of the present invention with edge motion buttons around a trackball input device.

FIGS. 7, 8, and 9 illustrate some of the variations of pointing device so that the input process for extended position icon movement can be discussed in context of variants of x-y input device 212 (first shown in FIG. 3).

One way is to incorporate a touchpad with "edge motion". Edge motion is a touchpad feature where the x-y input continues as along as the user's finger or thumb is sensed in an edge motion zone. Synaptics Incorporated of San Jose Calif. is one supplier of touchpads with an "edge motion" feature.

The x-y input device 212 of the pointing device 200 in FIG. 7 would appear to the user as shown in FIG. 2. FIG. 7 shows the x-y input device 212 with added lines distinguishing between various predefined areas of the touchpad. The area for traditional touchpad x-y input is defined by area 260. Moving the thumb tip 124 to right edge motion area 264 provides a signal to continue movement to the right. Thus, panning to fields off the screen in a spreadsheet with many columns can be achieved by moving the thumb tip to right edge motion area 264 and waiting until the image of the spreadsheet has moved sufficiently to make the desired columns visible. Panning back to the first column in the spreadsheet would be achieved by placing the thumb tip 124 in left edge motion area 272. Vertical scrolling would be achieved by moving the thumb tip into either upward edge motion area 276 or downward edge motion area 268. In all cases the thumb tip 124 may not need to actually touch the areas if the touchpad is set to sense the thumb tip 124 when it is very close to the surface of the touchpad.

The size of the various edge motion areas can be changed by configuration software to accommodate the user, and thus may vary from one pointing device to another. Likewise, the perimeter around area 260 may be set to have diagonal edge motion areas in the four corners of the touchpad (not shown), or have the corners inoperative as glide input (not shown) so that glide commands are not based on somewhat ambiguous placement of the thumb tip for example in both the upper and right corner.

One embodiment uses a trackball in place of the touchpad. The trackball is ringed with a plurality of semicircular buttons, which may be nudged by the thumb tip 124 to provide the desired edge motion command as would the edges of the touchpad described above. The trackball variation of the device gives the user a more visual and tactile method of cursor navigation and edge motion capability.

FIG. 9 illustrates that the edge motion areas (264, 268, 272, and 276) can be placed in a ring around a trackball 280.

Details on the Zero Force Touch Switches

As discussed above, the problem of small exertions associated with conventional mouse buttons is minimized by the use of zero force touch switches.

In one embodiment of the present invention, the zero force touch switches for index and middle fingers (224 and 228) are immovable metal or composite contacts that detect finger contact from the fingertips or the proximity of the fingertips instead of requiring a forced click as with other pointing device buttons. Note that in the case where actual touch from the user, rather than proximity is required by the sensing mechanism, the actual force applied will be near zero and not zero. This distinction does not alter the fact that the zero force touch switch virtually eliminates the stress imposed on the user's hand by the repetitive action to actuate the zero force touch switch. The positions of the zero force switches may be designed to be adjustable within their respective channels to better accommodate variations in finger length.

As a less desirable, yet economical alternative to one or all of the zero force touch switches, a mouse button type micro-switch with a very light activation force may be used. A micro-switch with performance characteristics equal to or better than those found in the original Microsoft® mouse would suffice.

Figure 14:
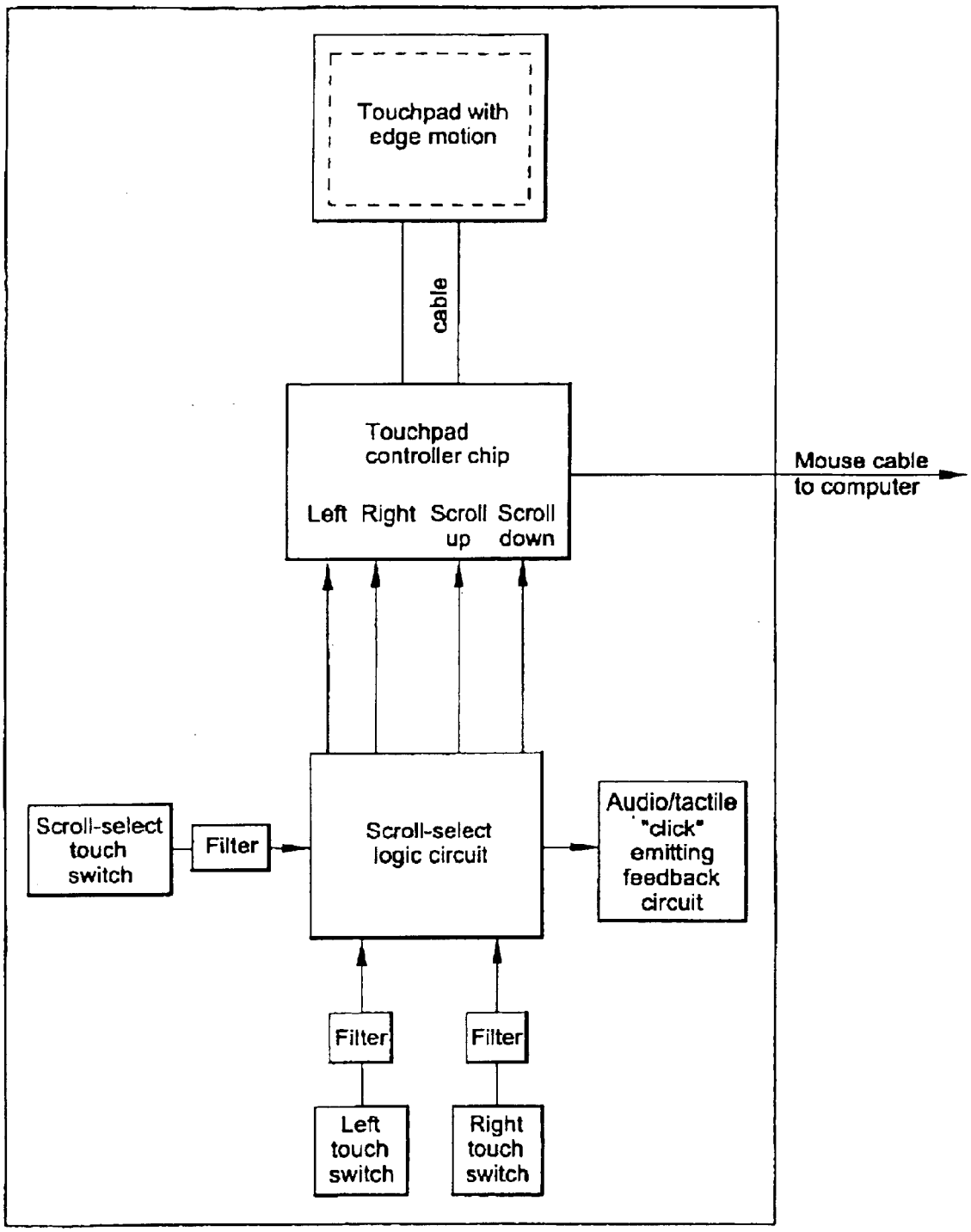
FIG. 14 is a block diagram for a touchpad-based pointing device.
Figure 15:
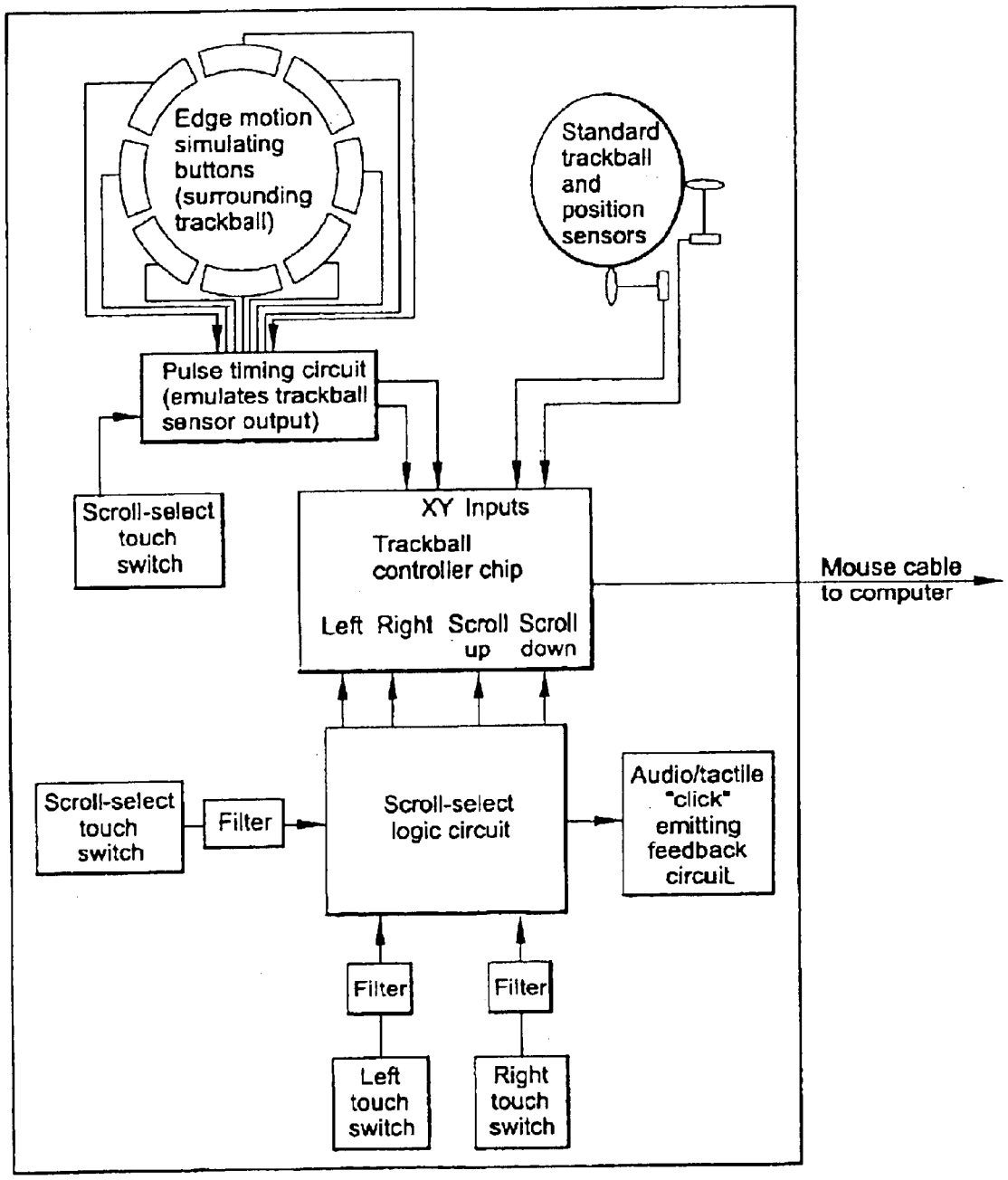
FIG. 15 is a block diagram for a track-ball based pointing device.

As with most pointing devices, a controller chip located within the housing of the device converts x-y input signals and "mouse button" inputs into digital information for the computer. FIGS. 14 and 15 illustrate the interaction of the controller chip with other components for a touch screen pointing device and a trackball based pointing device. With the zero force touch switches, circuitry known to the art detects finger capacitance or conductance in the buttons and supplies the "click" or "drag" signal to the mouse controller chip. The unique touch controls can help reduce soreness in fingers, tendons and muscles commonly associated with "clicking" conventional mouse buttons. The zero force touch switches are comfortably positioned at the fingertips and are slightly recessed to prevent accidental activation. Simple electronics known to the art, including an electromagnetic solenoid or a piezo crystal, etc., within the housing simulate the tactile "clicking" that a user would hear and feel if clicking a regular mouse button. In this way, the user knows instinctively when a touch switch is "pressed" and a signal is generated thereby easily developing the habit of avoiding unintentional clicks.

Alternatively, the touch switches can be optically triggered. The preferred embodiment of this alternative uses infrared optics although other wavelengths can be used. Infrared optics are considered very stable under varied conditions. As shown in FIG. 10, the optical touch switch 400 consists of an infrared light sensor 404 and corresponding light sensor 408 mounted across from one another in a channel 412 at the deepest part of a shallow depression 416. When incorporated in the pointing device 200, the shallow depression 416 would exist in the figure tip area of a molded channel such as molded channels 216 and 220 in the surface of the pointing device housing. As shown in FIG. 10b, a light beam 420 passes through the channel 412 from the light source 408 to light sensor 404 to indicate the absence of a fingertip.

As illustrated in FIG. 10c, when a fingertip, such as from index finger 108, extends to virtually the bottom of the depression, the light beam 420 is blocked and the fingertip is detected by the absence of a light beam at the light sensor 404. A conventional comparator circuit (not shown) may be added to fine-tune the response of the switch. Proper adjustment of both the comparator and the depth of the depression cause the switch to respond exactly when the bottom of the depression is touched by the fingertip. In a preferred embodiment, the actual depression is about twelve millimeters wide and approximately two millimeters deep.

The use of zero force touch switches for providing the clicking and dragging commands popularized by the mouse pointing device has the potential to reduce the fatigue and injury associated with extended mouse use. Another innovative feature of the present invention is to use the zero force touch switches for vertical scrolling.

Scrolling Capability

In today's world of heavy Internet surfing and the use of other scrollbar-intensive applications, mice with scroll wheels have become popular. See, for example U.S. Pat. No. 6,031,518 for Ergonomic Input Device described above that uses a scroll wheel driven by the middle finger. The direct translation of finger movement into scrollbar motion on the screen can save substantial amounts of clicking and dragging work. In addition to convenience, scroll wheel technology can potentially reduce hand movement and associated stresses. Unfortunately, the flexural action of jockeying the wheel with an index finger is similar to the motions described above in connection with moving a trackball. If done with frequency, such a motion of the index finger becomes yet another cause of harmful tendon and joint stress.

As is well known with the various mechanical wheels and rollers of traditional mouse devices, these mechanical implements are sensitive to buildups of dust and dirt within the device.

Superior to a scroll wheel, would be a pair touch switches linked to digital circuitry that generates a pulse matching that of a mouse wheel. With "touch scrolling", the user can simply touch an "up" or "down" touch switch and hold it as long as scroll movement is desired. Some mouse and touchpad controller chips may already include this circuitry, thus simplifying the addition of scroll touch switches. One example is the Synaptics® MultiSwitch TouchPad Model TM41P-350 pin-out of Connector J1. This touchpad's built in controller chip includes external connections for adding scroll buttons (or touch switches) with a minimum of extra circuitry.

Figure 13:
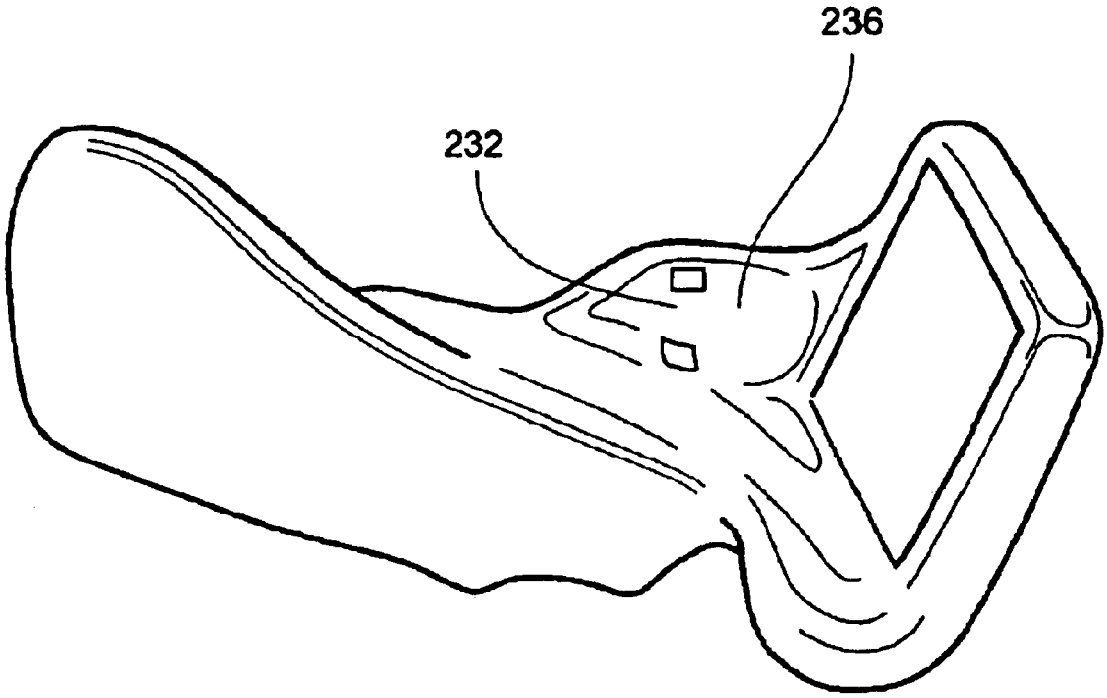
FIG. 13 shows a pointing device in accordance with the present invention with the scroll select touch switch.

A single "scroll-select" touch switch 232 was added to the top of the pointing device housing beside the thumb platform 208. As seen in FIG. 13, in a right handed unit, the scroll select touch switch 232 is situated in the concave protrusion 236 in the corner formed by the left top edge of the main body and the left edge of the bezel. The concave protrusion 236 and scroll select touch switch 232 are advantageously arranged to fit the left edge of the thumb 104 when it is resting on the left edge of the main body's top surface. In a preferred embodiment the scroll select touch switch 232 is a zero-force touch switch that is actuated by minute movements of the thumb to the left. On a left-handed pointing device (not shown), the thumb would move to the right.

Activation of the scroll select touch switch 232 activates a simple logic circuit, as known to the art, which redirects the function of the zero force touch switches (224 and 228) that normally serve as the right and left "mouse buttons" to instead activate each control scroll input of the mouse or touchpad controller chip. While the scroll select touch switch 232 is activated, activation of one of the two zero force touch switches (224 and 228) provides an upward edge motion signal to scroll up or a downward edge motion signal to scroll down. Thus, the user's fingers remain in the same position whether "clicking and dragging" or scrolling, and no motion is wasted. In the preferred embodiment of this alternative, the scroll select touch switch 232 is a zero force touch switch of the type described above. Note that a pointing device provided with both upward and downward edge motion areas (276 and 268) and a scroll select touch switch 232 may advantageously implement the two edge motion functions with different scrolling speeds so that the upward and downward edge motion areas (276 and 268) operate at a first scroll speed for short scrolling operations and the scrolling using a combination of the scroll select touch switch 232 and zero force touch switches (224 and 228) would operate at a second higher speed to allow for rapid movement.

Optionally the pointing device can be configured so that "double-clicking" the "scroll-select switch" puts pointing device in the popular "auto-scroll" mode wherein scrolling of the underlying image within the active window of the displayed image occurs with the x-y input applied via area 260, (or trackball 280) and any input to edge motion areas (264, 268, 272, or 276). Auto-scrolling differs from normal operation of the pointing device in that an x-y input from any of the above listed inputs would normally first move the position icon 316 to the edge of the active window before scrolling (or panning) the underlying image. In auto-scroll mode the position icon 316 maintains its position relative to the perimeter of the active window while the underlying image is scrolled.

Adjustments for Finger Length

In an alternative embodiment to what is disclosed in FIG. 10, FIGS. 16, 17 and 18 describe an adjustable system for altering the touch switches for the length of the user's fingers.

Figure 16:
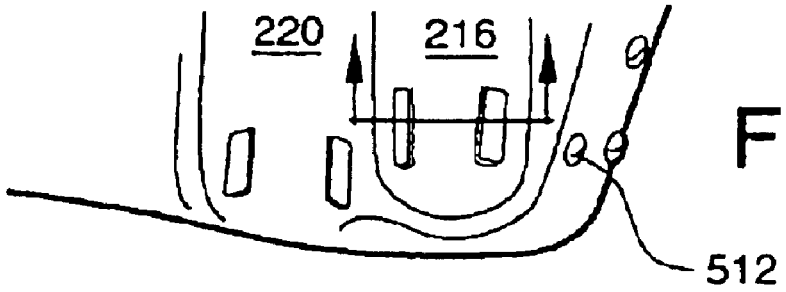
FIG. 16 is a portion of a preferred embodiment of the pointing device showing the channels for the index and middle fingers.
Figure 17:
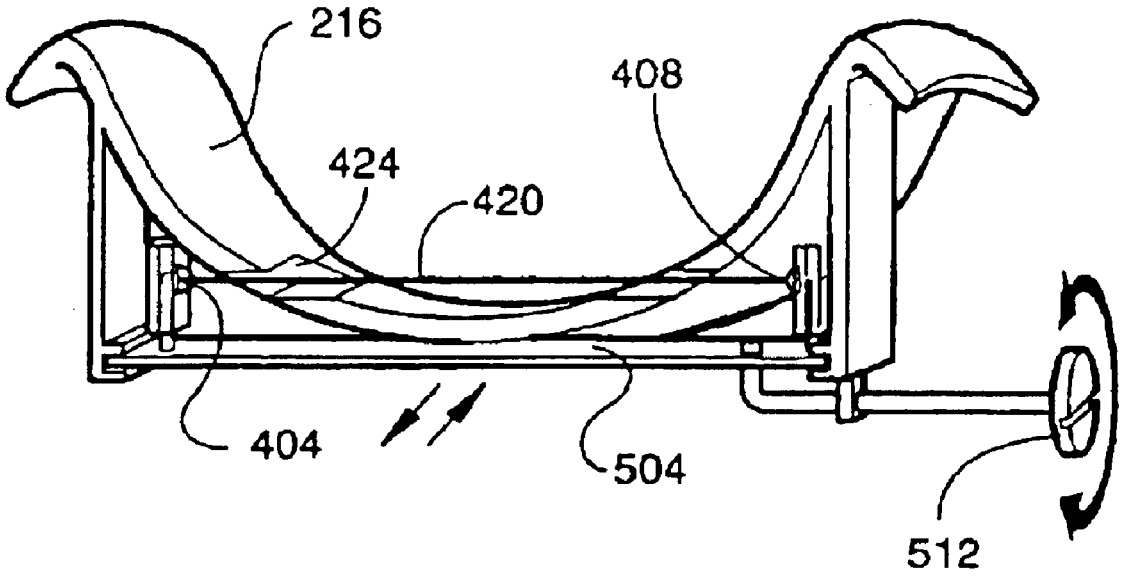
FIG. 17 shows a section from FIG. 16 to illustrate a mechanism for adjusting the placement of the light beam relative to the finger channels.

FIG. 16 shows the molded channel for the index finger 216 and the molded channel for the middle finger 220. Cross section AA of FIG. 16 is shown in FIG. 17. Thus, FIG. 17 shows a portion of the molded channel for the index finger 216 and the light beam 420 that traverses the channel from the source 404 to the sensor 408. A preferred embodiment uses beam windows 424 to pass the light beam (such as an infra-red light beam). It is preferred to have beam windows 424 with parallel faces so the beam window adjacent to the finger channel is not curved.

In this embodiment the light source 404 and light sensor 408 are mounted on a carriage 504 that can be moved in a frame 508 relative to the channel 216 in order to move the light beam 420 along the channel towards or away from the wrist so as to adjust for a range of finger lengths. One input means for finger length adjustment is the rotation of an externally accessible adjustment screw 512. The conversation of rotation of the adjustment screw 512 to motion of the carriage 504 can be accomplished by any of the ways known in the art. A simple pin and slot mechanism suitable for small ranges to rotation is shown here but the invention is not limited to that particular embodiment. The screw may be replaced by another input mechanism such as a lever or knob. A rack and pinion arrangement or other alternative would suffice. Electromechanical mechanisms to accomplish the movement, including mechanisms receiving digital input may be suitable for certain applications.

Figure 18:
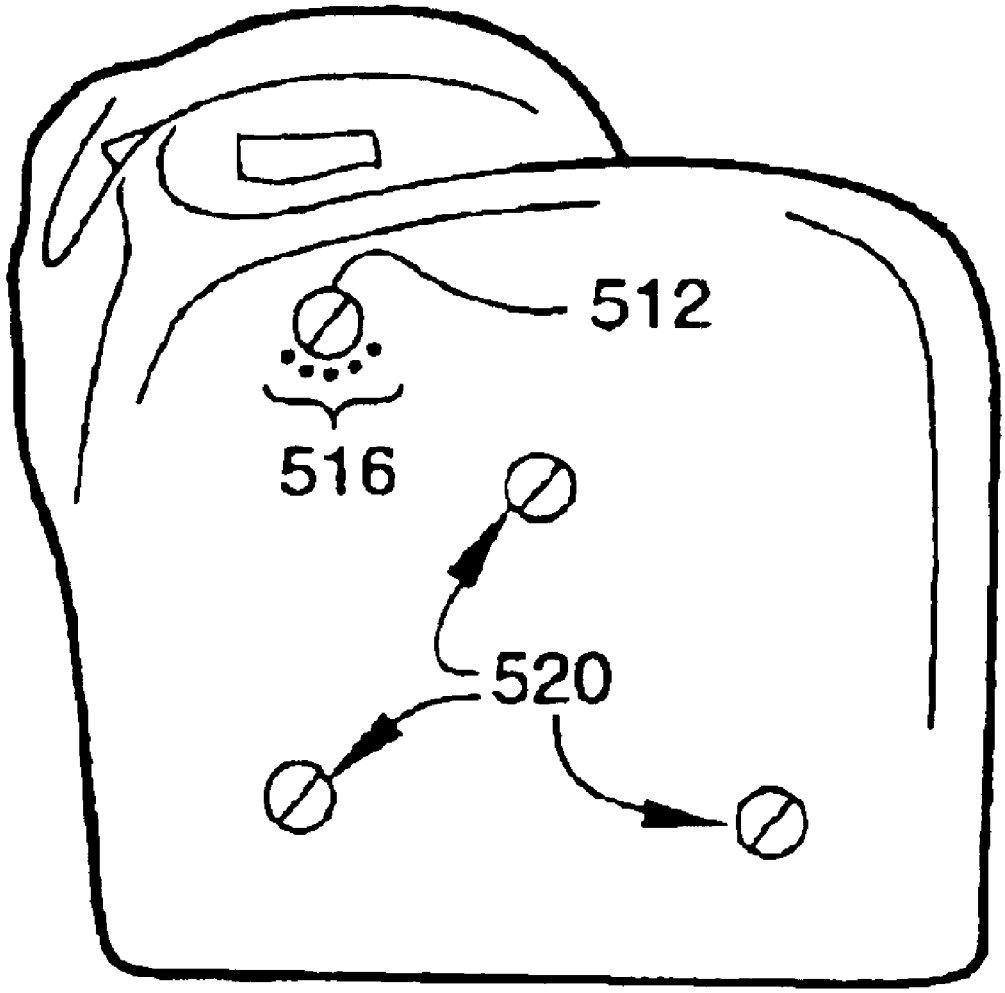
FIG. 18 shows a series of adjustment screws on a face of one embodiment of the pointing device.
Figure 19:
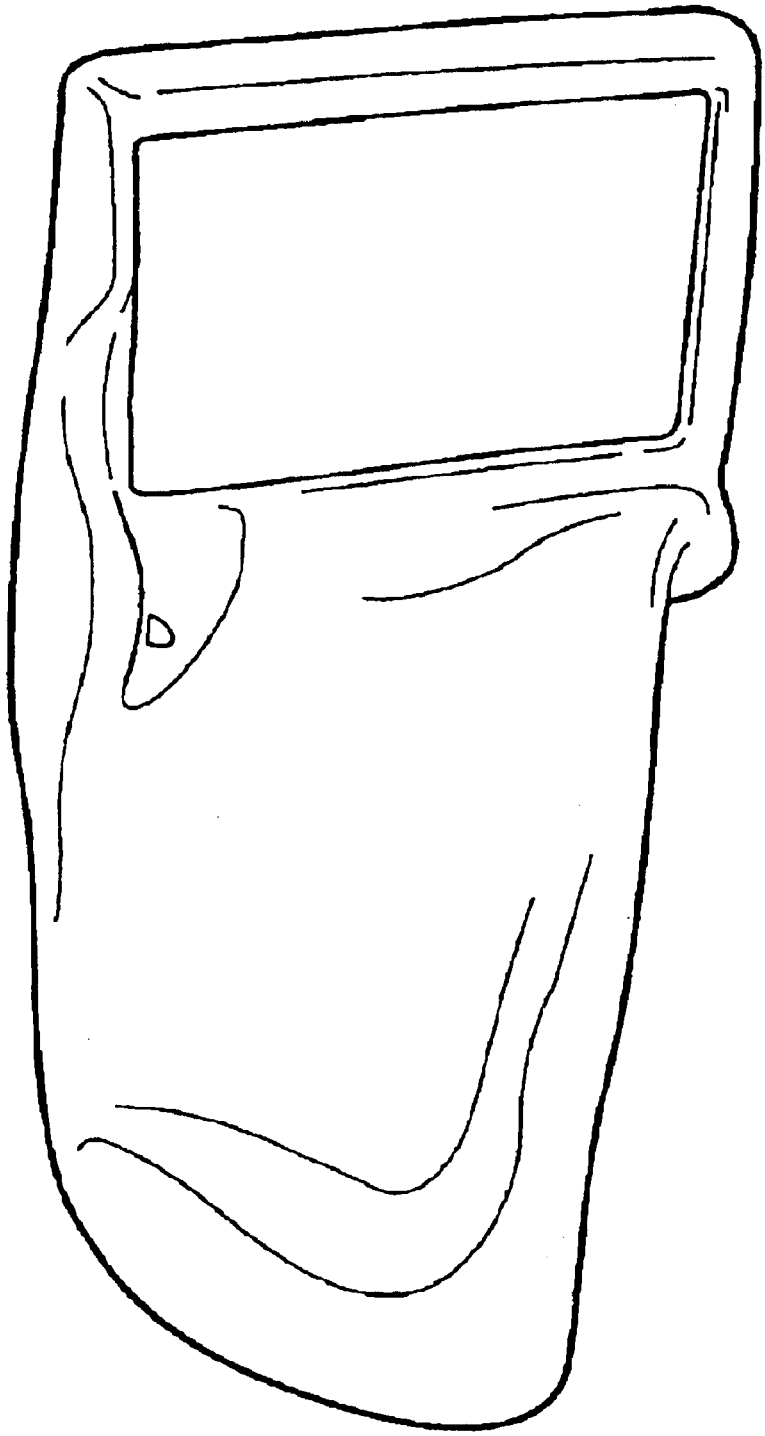
FIG. 19 is a perspective view of a preferred embodiment of the present invention as viewed from above looking from wrist end and toward distal end.
Figure 20:
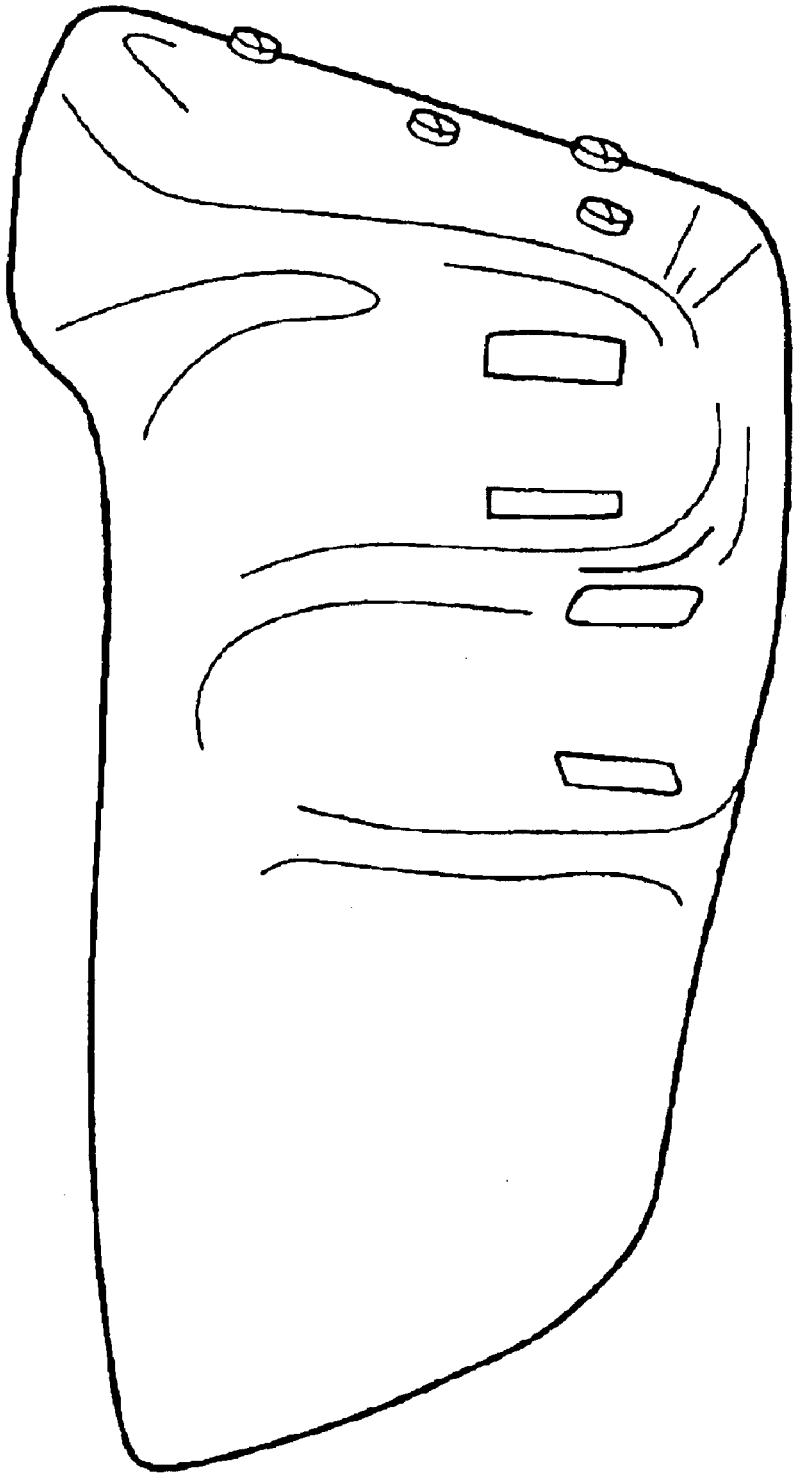
FIG. 20 is a view of a preferred embodiment of the present invention as viewed from below the device.
Figure 21:
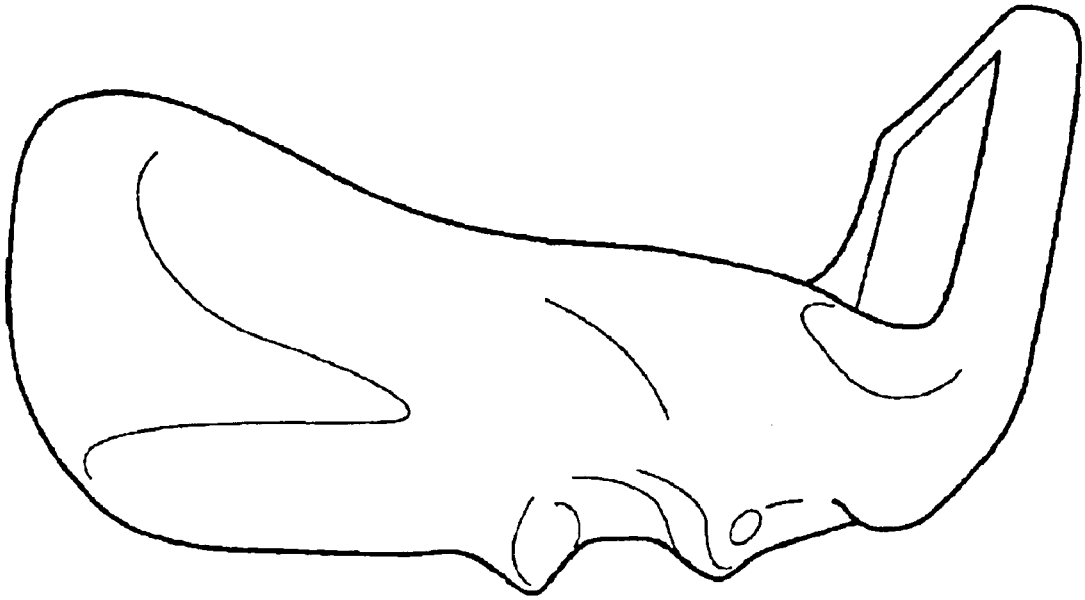
FIG. 21 is a view of a preferred embodiment of the present invention as viewed for the palm fin side of a right-handed device.
Figure 22:
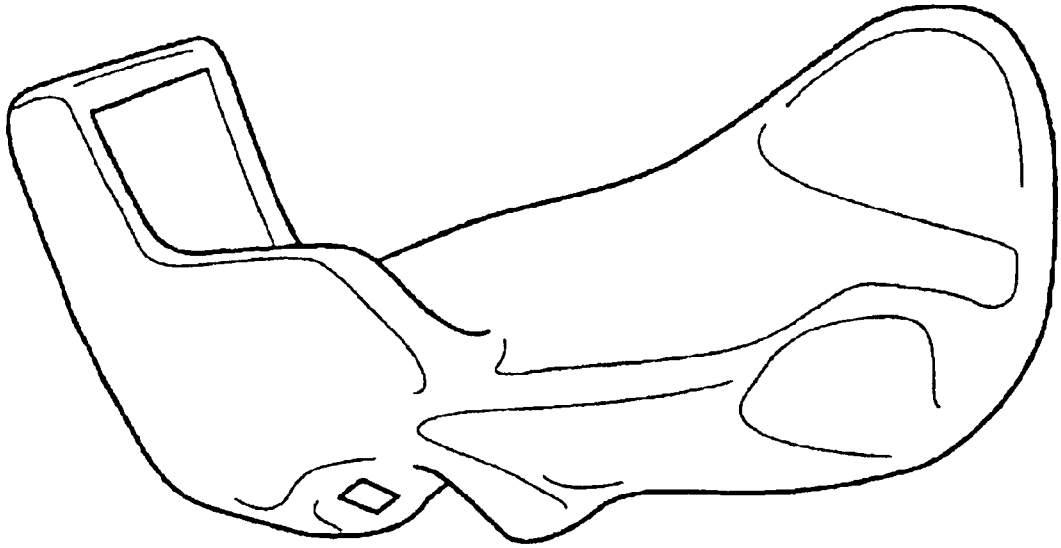
FIG. 22 is a view of a preferred embodiment of the present invention as viewed from the left side of a right-handed device.

A series of position indicator markings 516 as best seen in FIG. 18 may be added to assist users in noting the amount of rotation that the user applies. In the preferred embodiment, one adjustment screw is used to move the light beams for both the index finger channel 216 and the middle finger channel 220.

As seen on FIG. 18, a set of one or more tilt adjustment screws 520 allows the user to make some adjustment to the tilt of the touchscreen to further personalize the pointing device to the user's hand.

Those skilled in the art will recognize that the methods and apparatus of the present invention have many applications and that the present invention is not limited to the specific examples given to promote understanding of the present invention. Moreover, the scope of the present invention covers the range of variations, modifications, and substitutes for the system components described herein, as would be known to those of skill in the art. It is anticipated that other electronic actuators or x-y input devices will be developed or improved subsequent to the filing of this patent such that those components could be advantageously substituted for the components suggested within this patent while staying within the inventive concepts disclosed herein.

The legal limitations of the scope of the claimed invention are set forth in the claims that follow and extend to cover their legal equivalents. Those unfamiliar with the legal tests for equivalency should consult a person registered to practice before the patent authority which granted this patent such as the United States Patent and Trademark Office or its counterpart.

I claim:

1. An input device adapted for receiving an x-y input and input from at least one input actuator on the input device; the input device comprising:

a) a housing adapted for use independent of any solid surface beyond the user's hand;

b) the housing comprising a main body section with a long axis substantially parallel to a line in the body of a user grasping the pointing device running through the forearm of the user to the tip of the user's extended thumb;

c) the housing further comprising a platform for containment of an x-y input device, the platform placed to be protruding outward from and substantially perpendicular to and slightly skewed to one side of the long axis of the main body section;

d) the housing having a channel for placement of the user's index finger;

e) the housing having a channel for placement of the user's middle finger;

f) the channels positioned to place the user's index and middle fingers below and substantially orthogonal to the orientation of the user's thumb while the user is grasping the device;

g) an input actuator being integrally formed into a recessed portion of at least one of the channels; and h) an x-y input sensor placed at the end of the input device, distal to the user's wrist, such that the x-y input is provided to the x-y input sensor by movements of the thumb primarily comprised of circumduction of the thumb's basal joint.

2. The input device of claim 1 wherein the x-y input is provided by the thumb tip of the user.

3. The input device of claim 2 wherein the x-y input from the user's thumb tip is provided to a touchpad.

4. The input device of claim 3 wherein the touchpad may be tilted through use of at least one tilt adjustment screw.

5. The input device of claim 2 wherein the device senses the thumb tip at a perimeter input position and communicates to software the user's request for x-y movement of the object image under software control until the user's thumb tip cases to be detected at the perimeter position.

6. The input device of claim 2 wherein the x-y input from the user's thumb tip is provided to a touchpad and a set of perimeter input position commands are actuated by pressing tactile cursor movement buttons adjacent to the touchpad.

7. The input device of claim 1 wherein at least one of the input actuators comprises a zero force touch switch to receive mouse-button inputs.

8. The input device of claim 7 wherein the zero force touch switch detects contact of the user's finger.

9. The input device of claim 7 wherein the zero force touch switch detects the interruption of a beam of light.

10. The input device of claim 1 wherein the input actuator integrally formed in the recessed portion of the at least one channel further comprises:

a beam of light that travels between an emitter and a [detector and] *detector, and* an adjustment means for adjusting the placement of the emitter and detector pair along a path substantially perpendicular with the finger channel to allow adjustment of the activation position of the input actuator to accommodate variations in finger length.

11. The input device of claim 10 wherein the placement of the beam of light can be adjusted to accommodate a range of finger lengths via input to an adjustment screw.

12. The input device of claim 1 wherein the placement of a beam of light for an input actuator actuated by the [use's] *user's* index finger and the placement of a beam of light for an input actuator actuated by the user's middle finger are both adjusted by a common adjustment means for adjusting the placement of the beams of light.

13. The input device of claim 1 wherein the x-y input from the user's thumb is provided to a track ball.

14. The input device of claim 1 wherein the input actuator being integrally formed into a recessed portion of at least one of the channels is a zero force touch switch comprising a conductive capacitive sensing plate.

15. An input device adapted for receiving an x-y input and input from at least one input actuator on the input device; the input device comprising:

a) a housing adapted for use independent of any solid surface beyond the user's hand;

b) the housing comprising a main body section with a long axis substantially parallel to a line in the body of a user grasping the pointing device running through the forearm of the user to the tip of the user's extended thumb;

c) the housing further comprising a platform for containment of an x-y input device, the platform placed to be protruding outward from and substantially perpendicular to and slightly skewed to one side of the long axis of the main body section;

d) the housing having a first input actuator for engagement with the user's index finger;

e) the housing having a second input actuator for engagement with the user's middle finger;

f) the first and second input actuators positioned on a housing face in positions adapted to place the user's index and middle fingers substantially orthogonal to the orientation of the user's thumb while the user is [gasping] *grasping* the device with both the index and middle fingers positioned to allow input from the fingers to the first and second input actuators, and placing the tips of the user's index and middle fingers on the other side of the device from the user's thumb; and g) an x-y input sensor placed at the end of the input device, distal to the user's wrist, such that the x-y input is provided to the x-y input sensor by movements of the thumb.

16. The input of claim 15 further comprising:

a) a scroll-mode select touch switch positioned to be actuated by a movement of the thumb; and b) control logic to interpret the input from the scroll-mode select touch switch and the first input actuator wherein the control logic interprets the activation of the first input actuator after the onset of a maintained activation of the scroll-mode select touch switch as a request for continued scrolling of a displayed image on the computer's image display for as long as both the scroll-mode select touch switch and the first input actuator are activated.

17. The input device of claim 16 wherein the first input actuator is a zero force touch switch.

18. The input device of claim 15 further comprising:

a) a scroll-mode select touch switch positioned to be actuated by a movement of the thumb to toggle the operation of the x-y input sensor from a first mode to a second mode; and b) control logic to interpret the input from the scroll-mode select touch switch and the first input actuator wherein the control logic interprets the input to the scroll-mode touch switch as a request to toggle the operation of the control logic from a first mode to a second mode and while operating in the second mode, the control logic interprets input to the first input actuator as a request for continued scrolling of a displayed image on the computer's image display for as long as the first input actuator remains activated.

19. The input device of claim 18 wherein the first input actuator is a zero force touch switch.

20. An input device for receiving an x-y input from a user's thumb, comprising:

a housing having an upper surface shaped for supporting a user's thumb thereon in a position substantially coextensive with a user's forearm corresponding to the user's thumb;

a fin extending upward from said housing along a direction substantially parallel to the forearm of a user holding the input device in a manner for being used, said fin located for supporting a user's thumb at the region at which it connects to the hand;

at least one input actuator for receiving x-y input, the input actuator extending substantially perpendicularly upward from said housing at a location allowing a user's thumb to contact and to move in contact along the input actuator's surface without undesirable flexural motion of the thumb at the thumb's interphalangeal joint; and said housing having at least one other surface located substantially opposite to said upper surface for allowing at least a portion of at least one user's finger from the same hand as the thumb to be in contact therewith for allowing a user to operatively hold and support the device.

21. An input device for receiving input from at least one input actuator on the input device; the input device comprising:

a) a housing having a channel adapted to receive placement of a user's finger;

b) an input actuator being integrally formed into a recessed portion of the channel, wherein the input actuator detects the interruption of a beam of light between an emitter and a detector; and c) an adjustment means for adjusting the placement of the emitter and detector pair along a path substantially perpendicular with the finger channel to allow adjustment of the activation position of the input actuator to accommodate variations in finger length.

22. The input device of claim 21 wherein the channel is adapted to receive the user's index finger and further comprising:

d) a second channel in the housing adapted to receive the user's middle finger; and e) a second input actuator being integrally formed into a recessed portion of the second channel, wherein the second input actuator detects the interruption of a second beam of light between a second emitter and a second detector;

wherein the adjustment means for adjusting the placement of the emitter and detector pair along a path substantially perpendicular with the finger channel to allow adjustment of the activation position of the input actuator to accommodate variations in index finger length also adjusts the placement of the second emitter and the second detector along a path substantially perpendicular with the second finger channel to allow adjustment of the activation position of the second input actuator to accommodate variations in middle finger length.

23. The input device of claim 21 wherein the placement of the beam of light can be adjusted to accommodate a range of finger lengths via input to an adjustment screw.

24. An input device for receiving an x-y input from a user's thumb, comprising:

a housing having an upper surface shaped for supporting a user's thumb thereon in a position substantially coextensive with a user's forearm corresponding to the user's thumb;

at least one input actuator for receiving x-y input, the input actuator extending substantially perpendicularly upward from said housing at a location allowing a user's thumb to contact and to move in contact along the input actuator's surface without undesirable flexural motion of the thumb at the thumb's interphalangeal joint; and said housing having at least one other surface located substantially opposite to said upper surface for allowing at least a portion of at least one user's finger from the same hand as the thumb to be in contact therewith for allowing a user to operatively hold and support the device.

25. The input device of claim 24 further comprising a scroll-mode select switch placed in sufficient proximity to the at least one input actuator extending substantially perpendicularly upward from the housing so that a user can provide input to the input actuator with the user's thumb and then provide input to the scroll-mode select switch with the same thumb without requiring movement of the portion of the at least one user's finger in contact with the housing to operatively hold and support the device.

26. The input device of claim 24 wherein a scroll-mode select switch is located near the base of the input actuator and positioned for engagement by the thumb while moving from the position substantially coextensive with the user's forearm to a position further to the left for a thumb on a right hand using a right handed device and further to the right for a thumb on a left hand using a left handed device.

27. The input device of claim 25 further comprising a finger touch switch positioned at the bottom of a channel intended to receive and support the index finger from the same hand as the thumb of the user such that the movement of the index finger tip of a supported channeled index finger actuates the finger touch switch and a prescribed input to the scroll-mode select switch causes input to the finger touch switch to be interpreted as a request to scroll a document.

*28. An input device capable of receiving an x-y input and input from at least one input actuator on the input device, the input device comprising:*

*a housing adapted for use independent of any solid surface beyond the user's hand;*

*the housing comprising a main body section with a long axis substantially parallel to a line in the body of a user grasping the pointing device running through the forearm of the user to the tip of the user's extended thumb;*

*the housing further comprising a platform for containment of an x-y input device, the platform placed to be protruding outward from and substantially perpendicular to and slightly skewed to one side of the long axis of the main body section;*

*an input actuator being integrally formed into a recessed portion of at least one channel disposed on said housing capable of receiving placement of a finger; and*

*an x-y input sensor placed at the end of the input device, distal to the user's wrist, such that the x-y input is provided to the x-y input sensor by movements of the thumb primarily comprised of circumduction of the thumb's basal joint.*

*29. The input device of claim 28 wherein the x-y input is provided by the thumb tip of the user.*

*30. The input device of claim 29 further comprising a touchpad disposed on said housing, the touchpad being capable of receiving the x-y input from the user's thumb tip.*

*31. The input device of claim 30 further comprising at least one tilt adjustment screw capable of tilting the touchpad.*

*32. The input device of claim 29 wherein the input device is capable of sensing the thumb tip at a perimeter input position and is capable of communicating to software the user's request for x-y movement of the object image under software control until the user's thumb tip ceases to be detected at the perimeter input position.*

*33. The input device of claim 29 wherein the x-y input from the user's thumb tip is provided to a touchpad and a set of perimeter input position commands are capable of being actuated by pressing tactile cursor movement buttons adjacent to the touchpad.*

*34. The input device of claim 28 wherein at least one of the input actuators comprises a zero force touch switch capable of receiving mouse-button inputs.*

*35. The input device of claim 34 wherein the zero force touch switch is capable of detecting contact of the user's finger.*

*36. The input device of claim 34 wherein the zero force touch switch is capable of detecting the interruption of a beam of light.*

*37. The input device of claim 28 wherein the input actuator integrally formed in the recessed portion of the at least one channel further comprises:*

*means for emitting a beam of light capable of traveling between an emitter and a detector; and*

*means for adjusting placement of the emitter and detector pair along a path at least partially perpendicular with the channel to allow adjustment of the activation position of the input actuator to accommodate variations in finger length.*

*38. The input device of claim 37 wherein the placement of the beam of light is capable of being adjusted to accommodate a range of finger lengths via input to an adjustment screw.*

*39. The input device of claim 28 wherein the placement of a beam of light for an input actuator actuated by the use's index finger and the placement of a beam of light for an input actuator actuated by the user's middle finger are capable of being adjusted by a common adjustment means for adjusting the placement of the beams of light.*

*40. The input device of claim 28 further comprising a trackball capable of receiving the x-y input from the user's thumb.*

*41. The input device of claim 28 wherein the input actuator comprising a zero force touch switch, said zero force touch switch comprising a conductive capacitive sensing plate.*

*42. An input device capable of receiving an x-y input and input from at least one input actuator on the input device; the input device comprising:*

*a housing adapted for use independent of any solid surface beyond the user's hand;*

*the housing comprising a main body section with a long axis at least partially parallel to a line in the body of a user grasping the pointing device running through the forearm of the user to the tip of the user's extended thumb;*

*the housing further comprising a platform for containment of an x-y input device, the platform placed to be protruding outward from and at least partially perpendicular to and slightly skewed to one side of the long axis of the main body section;*

*the housing having an input actuator for engagement with the user's finger;*

*the input actuator being positioned on a housing face in a position capable of allowing a user to place the user's finger substantially orthogonal to the orientation of the user's thumb while the user is grasping the device with the finger positioned to allow input from the finger to the input actuators, and placing the tip of the user's finger on the other side of the device from the user's thumb; and*

*an x-y input sensor placed at the end of the input device, distal to the user's wrist, such that the x-y input is provided to the x-y input sensor by movements of the thumb.*

*43. The input device of claim 42 further comprising:*

*a scroll-mode select touch switch positioned to be capable of being actuated by a movement of the thumb; and*

*control logic capable of interpreting the input from the scroll-mode select touch switch and the input actuator wherein the control logic is capable of interpreting the activation of the input actuator after the onset of a maintained activation of the scroll-mode select touch switch as a request for continued scrolling of a displayed image on the computer's image display while the scroll-mode select touch switch and the input actuator are activated.*

*44. The input device of claim 43 wherein the input actuator is a zero force touch switch.*

*45. The input device of claim 42 further comprising:*

*a scroll-mode select touch switch positioned to be capable of being actuated by a movement of the thumb to toggle the operation of the x-y input sensor from a first mode to a second mode; and*

*control logic capable of interpreting the input from the scroll-mode select touch switch and the input actuator wherein the control logic is capable of interpreting the input to the scroll-mode touch switch as a request to toggle the operation of the control logic from a first mode to a second mode and while operating in the second mode, the control logic being capable of interpreting input to the input actuator as a request for continued scrolling of a displayed image on a computer's image display while the input actuator remains activated.*

*46. The input device of claim 45 wherein the input actuator is a zero force touch switch.*

*47. An input device capable of receiving an x-y input and input from at least one input actuator on the input device, the input device comprising:*

*means for housing adapted for use independent of any solid surface beyond the user's hand comprising a main body section with a long axis substantially parallel to a line in the body of a user grasping the pointing device running through the forearm of the user to the tip of the user's extended thumb;*

*said means for housing further comprising means for containing an x-y input device, wherein said means for containing is placed to be protruding outward from and substantially perpendicular to and slightly skewed to one side of the long axis of the main body section;*

*means for actuating an input wherein said means for actuating is integrally formed into a recessed portion of at least one channel disposed on said housing capable of receiving placement of a finger; and*

*means for sensing an x-y input wherein said means for sensing is placed at the end of the input device, distal to the user's wrist, such that the x-y input is provided to the means for sensing by movements of the thumb primarily comprised of circumduction of the thumb's basal joint.*

*48. An input device capable of receiving an x-y input and input from at least one input actuator on the input device; the input device comprising:*

*means for housing adapted for use independent of any solid surface beyond the user's hand, said means for housing comprising a main body section with a long axis at least partially parallel to a line in the body of a user grasping the pointing device running through the forearm of the user to the tip of the user's extended thumb;*

*said means for housing further comprising:*

*means for containing an x-y input device, wherein said means for containing is placed to be protruding outward from and at least partially perpendicular to and slightly skewed to one side of the long axis of the main body section;*

*means for actuating an input for engagement with the user's finger;*

*wherein said means for actuating an input is positioned on said means for housing in a position capable of allowing a user to place the user's finger substantially orthogonal to the orientation of the user's thumb while the user is gasping the device with the finger positioned to allow input from the finger to the means for actuating an input, and placing the tip of the user's finger on the other side of the device from the user's thumb; and*

*means for sensing an x-y input placed at the end of the input device, distal to the user's wrist such that the x-y input is provided to the means for sensing x-y input by movements of the thumb.*

*49. The input device of claim 48 further comprising:*

*means for selecting a scroll-mode positioned to be capable of being actuated by a movement of the thumb; and*

*means for interpreting the input from the means for selecting a scroll-mode and the means for actuating an input wherein the means for interpreting is capable of interpreting the activation of the means for actuating an input after the onset of a maintained activation of the means for selecting a scroll-mode as a request for continued scrolling of a displayed image on the computer's image display while the means for selecting a scroll-mode and the means for actuating an input are activated.*

*50. The input device of claim 48 further comprising:*

*means for selecting a scroll-mode positioned to be capable of being actuated by a movement of the thumb to toggle the operation of the means for sensing an x-y input from a first mode to a second mode; and*

*means for interpreting the input from the means for selecting a scroll-mode and the means for actuating an input wherein the means for interpreting is capable of interpreting the input to the means for selecting a scroll-mode as a request to toggle the operation of the means for interpreting from a first mode to a second mode and while operating in the second mode, the means for interpreting being capable of interpreting input to the means for actuating an input as a request for continued scrolling of a displayed image on a computer's image display while the means for actuating input remains activated.*

*51. A method for receiving an x-y input on an input device having a housing adapted for use independent of any solid surface beyond a user's hand comprising a main body section with a long axis that is substantially parallel to a line in the body of the user grasping the pointing device running through the forearm of the user to the tip of the user's extended thumb, a platform for containment of an x-y input device wherein the platform is placed to be protruding outward from and substantially perpendicular to and slightly skewed to one side of the long axis of the main body section, an input actuator being integrally formed into a recessed portion of at least one channel disposed on said housing, and an x-y input sensor placed at the end of the input device, distal to the user's wrist, the method comprising:*

*actuating said input actuator by receiving placement of a finger of the user thereon; and*

*sensing an x-y input with said x-y input sensor, such that the x-y input is provided to the x-y input sensor by movements of the thumb primarily comprised of circumduction of the thumb's basal joint.*

*52. A method for receiving an x-y input and input from at least one input actuator on an input device comprising a housing adapted for use independent of any solid surface beyond the user's hand comprising a main body section with a long axis at least partially parallel to a line in the body of a user grasping the pointing device running through the forearm of the user to the tip of the user's extended thumb and a platform for containment of an x-y input device, wherein said platform is placed to be protruding outward from and at least partially perpendicular to and slightly skewed to one side of the long axis of the main body section, an input actuator for engagement with the user's finger that is placed at the end of the input device, distal to the user's wrist and positioned on said housing in a position capable of allowing a user to place the user's finger substantially orthogonal to the orientation of the user's thumb while the user is gasping the device with the finger positioned to allow input from the finger to the input actuator, and placing the tip of the user's finger on the other side of the device from the user's thumb, and an x-y input sensor placed at the end of the input device, distal to the user's wrist, the method comprising:*

*actuating said input actuator by receiving placement of a finger of the user thereon; and*

*sensing an x-y input with the x-y input sensor, such that the x-y input is provided to the x-y input sensor by movements of the thumb.*

*53. The method of claim 52 further comprising:*

*actuating a scroll-mode select touch switch positioned on said housing to be capable of being actuated by a movement of the thumb; and*

*interpreting the input from the scroll-mode select touch switch and the input actuator with a control logic on said device, such that the activation of the input actuator is interpreted after the onset of a maintained activation of the scroll-mode select touch switch as a request for continued scrolling of a displayed image on the computer's image display while the scroll-mode select touch switch and the input actuator are activated.*

*54. The method of claim 52 further comprising:*

*actuating a scroll-mode select touch switch positioned to be capable of being actuated by a movement of the thumb to toggle the operation of the x-y input sensor from a first mode to a second mode; and*

*interpreting the input from the scroll-mode select touch switch and the input actuator with a control logic on said device such that the input to the scroll-mode touch switch is interpreted as a request to toggle the operation of the control logic from a first mode to a second mode; and*

*interpreting input to the input actuator with the control logic as a request for continued scrolling of a displayed image on a computer's image display while the input actuator remains activated while operating in the second mode.*

* * * * *

UNITED STATES PATENT AND TRADEMARK OFFICE

CERTIFICATE OF CORRECTION

PATENT NO. : RE 40,324 E
APPLICATION NO. : 11/409542
DATED : May 20, 2008
INVENTOR(S) : Peter James Crawford It is certified that error appears in the above-identified patent and that said Letters Patent is hereby corrected as shown below:

Column 20 Line 22 Claim 5 “cases” should read --ceases--

Column 24 Line 27 Claim 39 “use’s” should read --user’s--

Signed and Sealed this

Twenty-fourth Day of March, 2009

JOHN DOLL
*Acting Director of the United States Patent and Trademark Office*